United States Patent
Ohkawa

(10) Patent No.: US 9,372,300 B2
(45) Date of Patent: Jun. 21, 2016

(54) LIGHT-EMITTING UNIT AND DISPLAY

(71) Applicant: Sony Corporation, Tokyo (JP)

(72) Inventor: Shingo Ohkawa, Saitama (JP)

(73) Assignee: Sony Corporation (JP)

( * ) Notice: Subject to any disclaimer, the term of this patent is extended or adjusted under 35 U.S.C. 154(b) by 65 days.

(21) Appl. No.: 14/524,356

(22) Filed: Oct. 27, 2014

(65) Prior Publication Data
US 2015/0124478 A1 May 7, 2015

(30) Foreign Application Priority Data
Nov. 7, 2013 (JP) .................................. 2013-231204

(51) Int. Cl.
*F21V 8/00* (2006.01)

(52) U.S. Cl.
CPC .............. *G02B 6/0068* (2013.01); *G02B 6/005* (2013.01); *G02B 6/0073* (2013.01); *G02B 6/0091* (2013.01)

(58) Field of Classification Search
CPC .... G02B 6/005; G02B 6/0068; G02B 6/0073; G02B 6/0091
See application file for complete search history.

(56) References Cited

U.S. PATENT DOCUMENTS

| | | | | |
|---|---|---|---|---|
| 6,909,480 B2* | 6/2005 | Hiraishi | ............... | G02B 5/0242 349/112 |
| 7,819,568 B2* | 10/2010 | Iwasaki | ............... | G02B 6/0068 362/612 |
| 8,797,480 B2* | 8/2014 | Goto | .................... | G02B 6/0038 349/62 |

FOREIGN PATENT DOCUMENTS

JP 2009-087570 A 4/2009

* cited by examiner

*Primary Examiner* — Stephen F Husar
(74) *Attorney, Agent, or Firm* — Lerner, David, Littenberg, Krumholz & Mentlik, LLP

(57) ABSTRACT

Provided is a light-emitting unit that includes: a light-guide section having a light entering surface; and a plurality of light sources opposed to the light entering surface of the light-guide section and arrayed in a first direction, and each having an anisotropy in emission intensity. A pattern shape of light applied from any of the light sources to the light entering surface has a shape anisotropy, and the light sources are each disposed to allow a longitudinal direction of the pattern shape to be inclined relative to the first direction.

14 Claims, 29 Drawing Sheets

LIGHT-EMITTING UNIT AND DISPLAY

CROSS REFERENCE TO RELATED APPLICATIONS

This application claims the benefit of Japanese Priority Patent Application JP2013-231204 filed Nov. 7, 2013, the entire contents of which are incorporated herein by reference.

BACKGROUND

The disclosure relates to a light-emitting unit which may be used, without limitation, for a backlight unit of a display, and to a display provided with the light-emitting unit.

For a backlight of a display such as a liquid crystal display, a planar-light-emitting unit is used that causes, using a light-guide plate, planar light emission of light emitted from a light source such as a light-emitting diode (LED). For example, Japanese Unexamined Patent Application Publication No. 2009-87570 proposes a planar-light-emitting unit in which a laser diode is used for a light source.

SUMMARY

What is desired in a light-emitting unit, in which a laser diode is used as described above, is to reduce luminance unevenness or color unevenness in a light emission plane.

It is desirable to provide a light-emitting unit capable of reducing luminance unevenness or color unevenness in a light emission plane, and a display provided with the light-emitting unit.

A light-emitting unit according to an embodiment of the disclosure includes: a light-guide section having a light entering surface; and a plurality of light sources opposed to the light entering surface of the light-guide section and arrayed in a first direction, and each having an anisotropy in emission intensity. A pattern shape of light applied from any of the light sources to the light entering surface has a shape anisotropy, and the light sources are each disposed to allow a longitudinal direction of the pattern shape to be inclined relative to the first direction.

A display according to an embodiment of the disclosure is provided with a display panel and a light-emitting unit configured to illuminate the display panel. The light-emitting unit includes: a light-guide section having a light entering surface; and a plurality of light sources opposed to the light entering surface of the light-guide section and arrayed in a first direction, and each having an anisotropy in emission intensity. A pattern shape of light applied from any of the light sources to the light entering surface has a shape anisotropy, and the light sources are each disposed to allow a longitudinal direction of the pattern shape to be inclined relative to the first direction.

In the light-emitting unit and the display according to the above-described embodiments of the disclosure, the plurality of light sources are arrayed in the first direction for the light entering surface of the light-guide section. Each of the light sources has an anisotropy in emission intensity, and the pattern shape formed by the application of light to the light entering surface has a shape anisotropy. The light sources are each disposed to allow the longitudinal of the pattern shape to be inclined from the first direction. Thus, even when there is a difference in emission intensity between the light sources, an influence caused by the difference is reduced, making it easier to uniformize luminance distributions derived from the respective light sources.

According to the light-emitting unit and the display in the above-described embodiments of the disclosure, the plurality of light sources are provided that are arrayed in the first direction for the light entering surface of the light-guide section. Each of the light sources has an anisotropy in emission intensity, and the pattern shape formed by the application of light to the light entering surface has a shape anisotropy. The light sources are each disposed to allow the longitudinal of the pattern shape to be inclined from the first direction. Thus, even when there is a difference in emission intensity between the light sources, it is possible to uniformize luminance distributions derived from the respective light sources. Hence, it is possible to reduce luminance unevenness or color unevenness in a light emission plane.

It is to be noted that what is described above is one example of the disclosure. Also, effects of the disclosure are not limited to those described above. Effects achieved by the disclosure may be those that are different from the above-described effects, or may include other effects in addition to those described above. Further, it is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

In the following, some example embodiments of the disclosure are described in detail in the following order with reference to the accompanying drawings.

1. First Embodiment (An example of a backlight unit in which a plurality of laser light sources are arranged to be turned around respective optical axes)

2. First Modification (An example in which a first inclination angle is varied in accordance with directivity of the laser light source)

3. Second Embodiment (An example of a backlight unit in which the plurality of laser light sources are arranged such that respective optical axes are inclined relative to a light entering surface of a light-guide plate)

4. Second Modification (An example of arrangement in which the light sources are so arranged as to be offset from one another between upper and lower light-guide plates)

5. Third Modification (An example of arrangement in which the light sources are arranged at other side surfaces)

6. Fourth Modification (An example in which a monochromatic laser light source is used)

7. Fifth Modification (An example in which the laser light source and an LED light source are used in combination)

8. Application Examples

First Embodiment

Configuration

Figure 1:
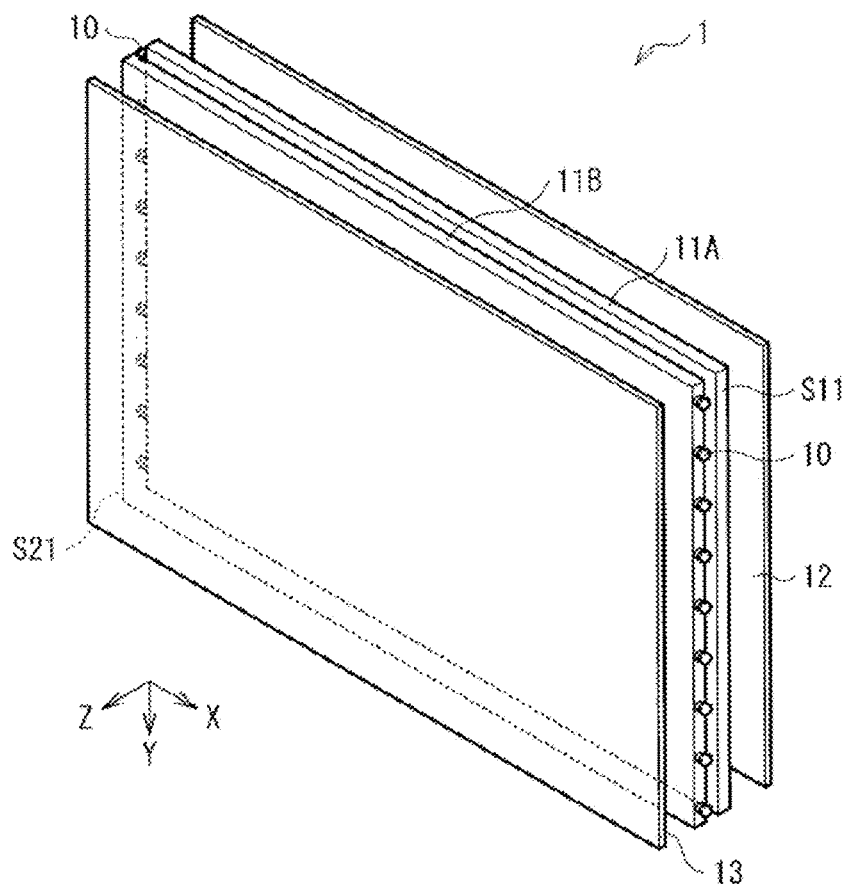
FIG. 1 is a perspective view illustrating an example of an overall configuration of a backlight unit according to a first embodiment of the disclosure.
Figure 2:
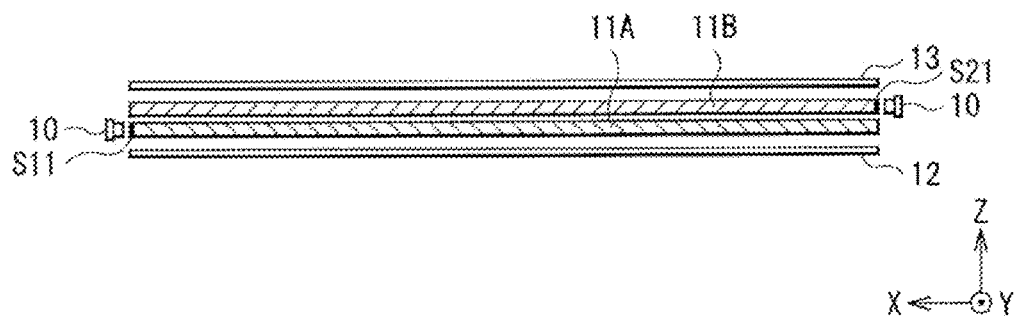
FIG. 2 is a cross-sectional view illustrating a configuration of the backlight unit illustrated in FIG. 1.

FIG. 1 illustrates an overall configuration of a light-emitting unit (a backlight unit 1) according to a first embodiment of the disclosure. FIG. 2 illustrates a cross-sectional configuration of the backlight unit 1. For example, the backlight unit 1 may illuminate a transmissive liquid crystal panel from behind thereof, and may include light sources 10, a first light-guide plate 11A, a second light-guide plate 11B, a reflection sheet 12, and an optical sheet 13. In one embodiment, the first light-guide plate 10A and the second light-guide plate 10B correspond to a specific but non-limiting example of a "light-guide section".

Each of the light sources 10 is a point light source, and may include a laser diode (a semiconductor laser). The laser diode may be, for example but not limited to, a laser diode that emits color light of red, green, or blue. The plurality of such light sources 10 are provided side-by-side and are in opposition to light entering surfaces S11 and S21 of the respective first and second light-guide plates 11A and 11B, as described later in detail. However, the light source 10 may be a light-emitting diode (LED). Also, the laser diodes and the light-emitting diodes may be provided in a mixed fashion in the plurality of light sources 10.

The first light-guide plate 11A and the second light-guide plate 11B each may be a plate-like optical member (may have a flat rectangular parallelepiped shape), for example. The first light-guide plate 11A has the light entering surface S11 and a light exiting surface (a later-described light exiting surface S12), and guides light entered from the light entering surface S11 to the light exiting surface S12. The second light-guide plate 11B has the light entering surface S21 and a light exiting surface (a later-described light exiting surface S22), and guides light entered from the light entering surface S21 to the light exiting surface S22. Each of the first light-guide plate 11A and the second light-guide plate 11B may mainly include a transparent thermoplastic resin such as, but not limited to, a polycarbonate resin (PC) or an acrylic resin (for example, PMMA (polymethyl methacrylate)), for example. For example, the first light-guide plate 11A and the second light-guide plate 11B may be so disposed as to be overlapped (stacked) with each other in a Z direction, thereby causing superposed light, in which pieces of emission light derived from the respective first and second light-guide plates 11A and 11B are superimposed, to form an emission luminance distribution in the backlight unit 1.

Figure 3A:
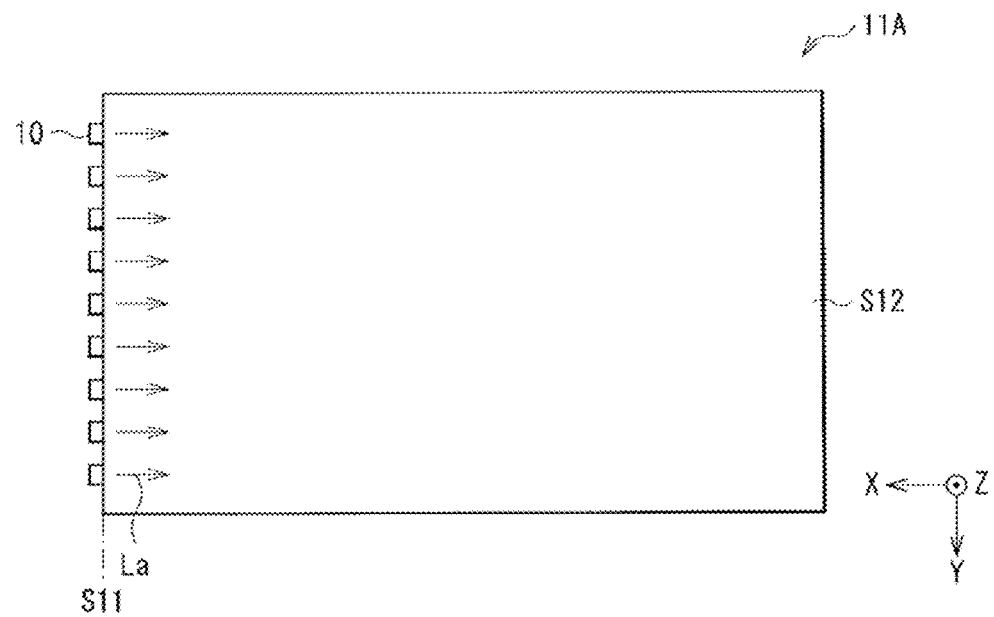
FIG. 3A is a plan view illustrating an outline configuration of light sources and a first light-guide plate illustrated in FIG. 1.
Figure 3B:
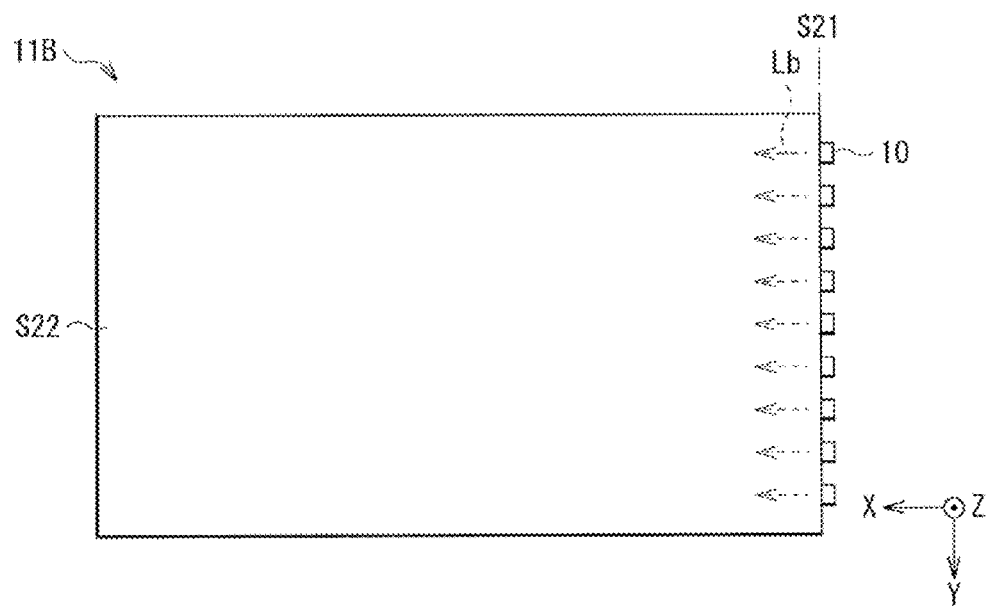
FIG. 3B is a plan view illustrating an outline configuration of the light sources and a second light-guide plate illustrated in FIG. 1.

FIG. 3A is a plan view in an X-Y plane illustrating an arrangement configuration of the first light-guide plate 11A and the light sources 10. FIG. 3B is a plan view in an X-Y plane illustrating an arrangement configuration of the second light-guide plate 11B and the light sources 10. In the first light-guide plate 11A, one or more surfaces (in this embodiment, one side surface) serves as the light entering surface S11, and one main surface (a surface in opposition to the second light-guide plate 11B) serves as the light exiting surface S12. In the second light-guide plate 11B, one or more surfaces (in this embodiment, one side surface) serves as the light entering surface S21, and one main surface (a surface in opposition to the optical sheet 13) serves as the light exiting surface S22. In the present embodiment, the light exiting surface S22 of the second light-guide plate 11B form a light emission plane of the entire light-guide section.

The first light-guide plate 11A and the second light-guide plate 11B are so stacked as to prevent overlapping of the light entering surface S11 and the light entering surface S21 in the Z direction. In one embodiment, the light entering surface S11 of the first light-guide plate 11A is provided on one (for example, the right side surface) of the two side surfaces corresponding to the short sides in an XY planar shape (for example, a rectangular shape), and the light entering surface S21 of the second light-guide plate 11B is provided on the other (for example, the left side surface) of the two side surfaces corresponding to the short sides in the rectangular shape. The plurality of light sources 10 are so arrayed in one direction (in a first direction d1 to be described later) as to be opposed to each of the light entering surfaces S11 and S21 of the respective first and second light-guide plates 11A and 11B. Such a configuration causes light La and light Lb derived from the light sources 10 to enter the respective first and second light-guide plates 11A and 11B in opposite directions from each other.

Figure 4A:
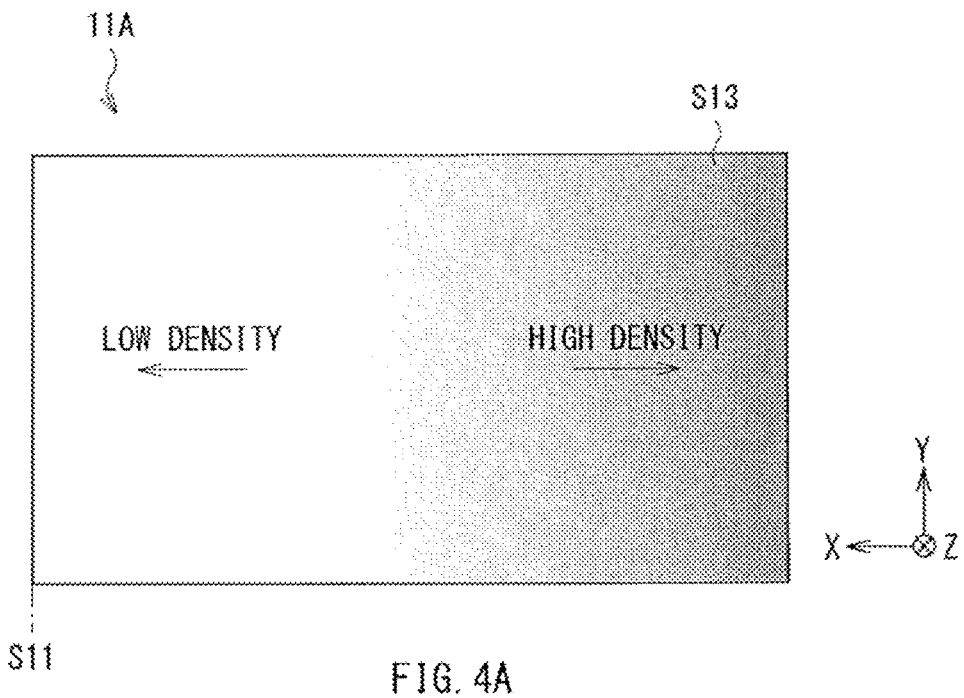
FIG. 4A is a schematic plan view for describing a dot pattern of the first light-guide plate illustrated in FIG. 3A.
Figure 4B:
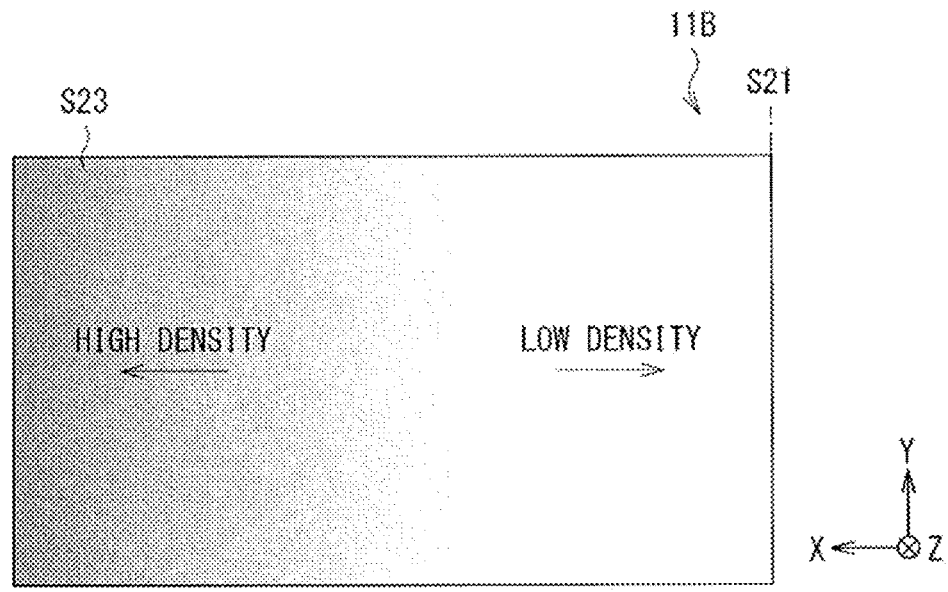
FIG. 4B is a schematic plan view for describing a dot pattern of the second light-guide plate illustrated in FIG. 3B.

FIG. 4A is a schematic view for describing a dot pattern of the first light-guide plate 11A. FIG. 4B is a schematic view for describing a dot pattern of the second light-guide plate 11B. A back surface (the surface opposed to the reflection sheet 12) S13 of the first light-guide plate 11A may have a dot pattern in which fine dots (convex portions or concave portions) are provided regularly or irregularly (provided at random), for example. Likewise, a back surface (the surface opposed to the first light-guide plate 11A) S23 of the second light-guide plate 11B may have a dot pattern in which the dots are provided regularly or at random.

In each of the first light-guide plate 11A and the second light-guide plate 11B, a density of the dots in the dot pattern described above may be so configured as to be varied in accordance with a distance from the light entering surface S11 or S21. In one embodiment, the density of dots in the first light-guide plate 11A becomes higher with an increase in distance from the light entering surface S11 (becomes lower as approaching the light entering surface S11). In the second light-guide plate 11B, the density of dots becomes higher with an increase in distance from the light entering surface S21 (becomes lower as approaching the light entering surface S21). For example, the density of dots may be varied in a stepwise fashion by varying factors such as, but not limited to, the number of dots, a pitch, and a size, for each region.

In the present embodiment, the light sources 10 that emit light toward the first light-guide plate 11A and the second light-guide plate 11B as described above are disposed to oppose the light-entering surfaces S11 and S21 while being turned at a predetermined angle around respective optical axes. In the following, a description is given with reference to an example of a combination of the first light-guide plate 11A and the light sources 10 disposed to oppose the light entering surface S11 thereof unless particular distinction is necessary; however, the same arrangement and configuration apply likewise to the light sources 10 disposed to oppose the light entering surface S21 of the second light-guide plate 11B.

Figure 5A:
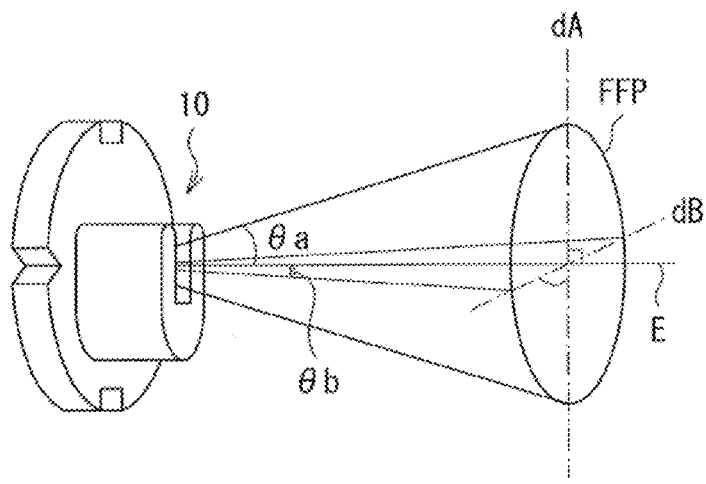
FIG. 5A is a schematic view for describing an anisotropy (directivity) in an emission intensity of a laser diode.
Figure 5B:
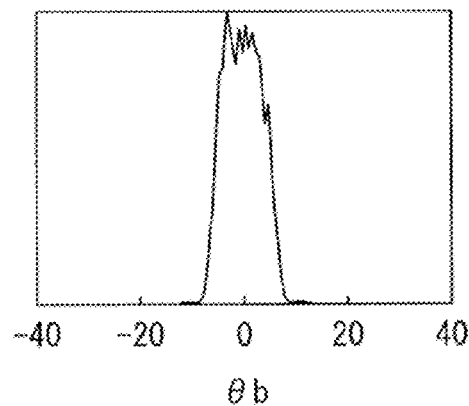
FIG. 5B is a characteristic diagram showing an example of the emission intensity (in a lateral direction) of the laser diode.
Figure 5C:
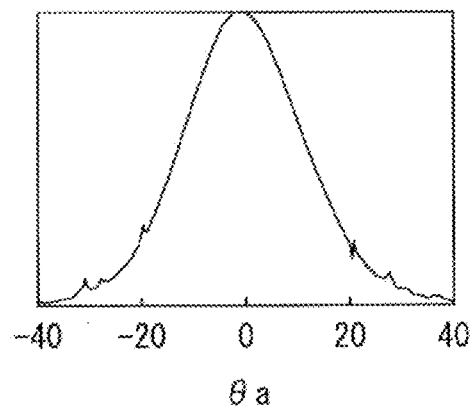
FIG. 5C is a characteristic diagram showing an example of the emission intensity (in a longitudinal direction) of the laser diode.

For example, the light source 10 may be the laser diode whose emission light thus has an anisotropy (directivity) in emission intensity. As illustrated in FIG. 5A, light emitted from the light source 10, or the laser diode in this embodiment, has a shape anisotropy in a plane perpendicular to an optical axis E and thus may spread in an elliptical shape (i.e., a far-field pattern (FFP) of the emission light derived from the light source 10 has a shape of an ellipse), for example. The elliptical shape has a major axis $d_A$ in a direction in which a half-value angle in the emission intensity becomes the maximum, and has a minor axis $d_B$ in a direction in which the half-value angle becomes the minimum. In other words, the emission intensity differs in the direction along the minor axis $d_B$ (in the lateral direction, as shown in FIG. 5B) and in the direction along the major axis $d_A$ (in the longitudinal direction, as shown in FIG. 5C).

The major axis $d_A$ and the minor axis $d_B$ intersect each other at substantially 90 degrees. Also, when a maximum value of the half-value angle in the emission intensity (the half-value angle in a cross-section along the major axis $d_A$ of the emission light) is defined as θa and a minimum value of the half-value angle in the emission intensity (the half-value angle in a cross-section along the minor axis $d_B$ of the emission light) is defined as θb, the half-value angle θb may be equal to or less than about ½ of the half-value angle θa, for example.

Figure 6:
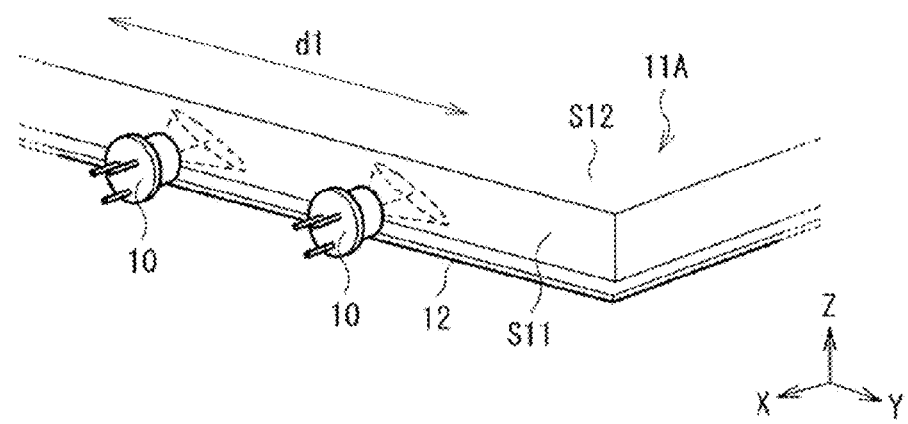
FIG. 6 is a perspective view illustrating an example of a detailed arrangement of the light sources illustrated in FIG. 1.
Figure 7A:
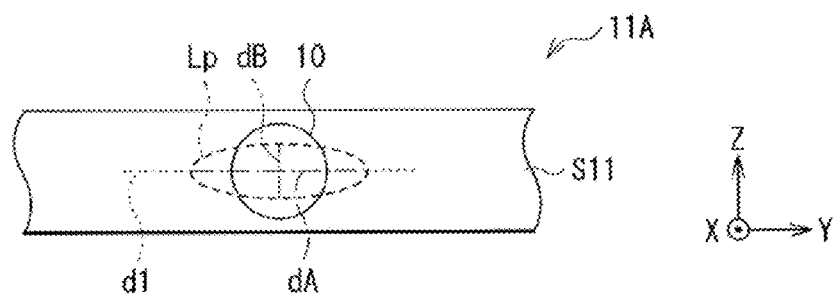
FIG. 7A is a schematic view for describing a reference arrangement (θr=0°) of the light source.
Figure 7B:
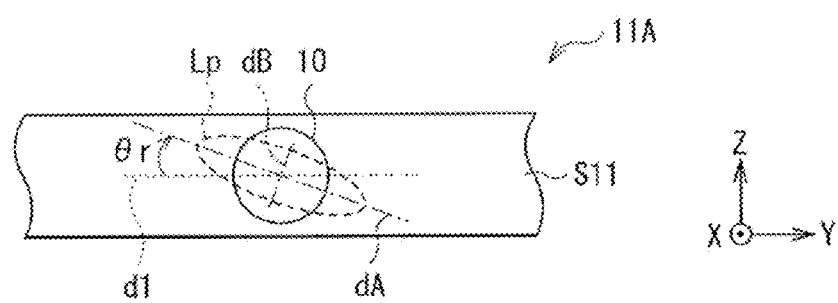
FIG. 7B is a schematic view for describing an inclined arrangement (θr>0°) of the light source.

FIG. 6 is a perspective view illustrating an example of a detailed arrangement of the light sources 10 for the light entering surface S11. FIG. 7A schematically illustrates a reference arrangement (inclination angle (turning angle) θr=0°) of the light source 10, whereas FIG. 7B schematically illustrates an inclined arrangement (inclination angle θr>0°) of the light source 10. As illustrated in FIG. 7B, the light source 10 is so disposed as to be turned around its optical axis from the state illustrated in FIG. 7A as a reference. In one embodiment, the inclination angle θr corresponds to a specific but non-limiting example of a "first inclination angle".

Figure 8:
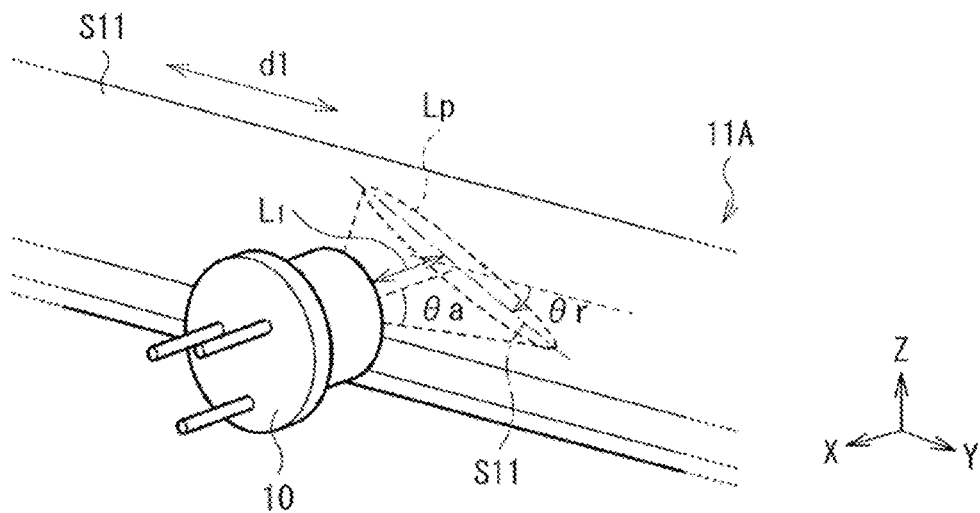
FIG. 8 schematically illustrates design parameters that achieve a preferred arrangement of the light source illustrated in FIG. 5A.

The emission light derived from the light source 10 has the directivity; hence, a shape of a region irradiated therewith (i.e., a pattern shape $L_P$) on the light entering surface S11 may be in the shape of the ellipse including the major axis $d_A$ and the minor axis $d_B$ as described above, for example. In the present embodiment, the light source 10 is disposed such that the major axis $d_A$ (the longitudinal direction) of the pattern shape $L_P$ is inclined relative to the first direction d1 (in the present embodiment, relative to a Y direction) for the light entering surface S11. An angle between the first direction d1 and the major axis $d_A$ in the light entering surface S11 (i.e., the inclination angle θr) may be preferably set at an appropriate value in accordance with factors such as, but not limited to, a pitch of the light sources 10, the half-value angle, and a color mixing distance, although the angle therebetween is not particularly limited. In one embodiment, the following expression (1) may be satisfied:

$$2*L_1*\tan\theta a*\sin\theta r \le t \tag{1}$$

where $L_1$ is a distance between the light source 10 and the first light-guide plate 11A and t is a thickness of the first light-guide plate 11A, as illustrated in FIG. 8.

Figure 9:
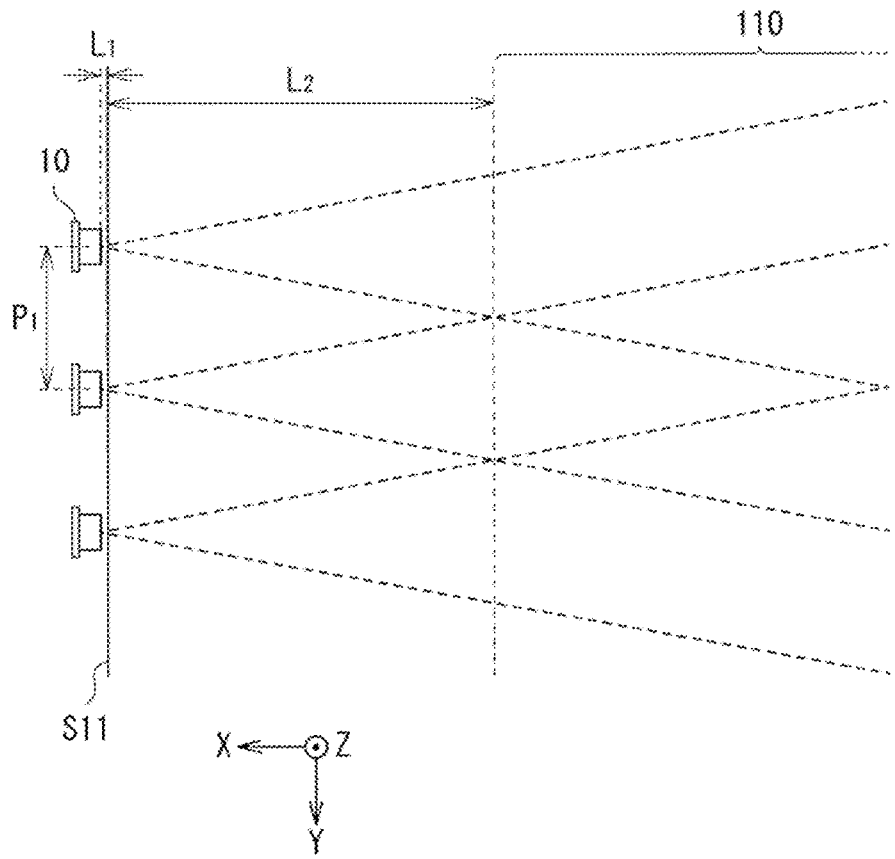
FIG. 9 schematically illustrates design parameters that achieve the preferred arrangement of the light source illustrated in FIG. 5A.

More preferably, the following expressions (2) to (4) may be satisfied for the light sources 10 that are the same in type as each other (e.g., the light sources that are equal in a ratio of the half-value angle θb to the half-value angle θa (θb/θa) to each other) in the light sources 10 disposed for the light entering surface S11:

$$P_1/2/\tan\theta_2 < L_2 \tag{2}$$

$$\theta_2 = \sin^{-1}(\sin\theta_1/n) \tag{3}$$

$$\theta_1 = \tan^{-1}(\tan\theta a*\cos\theta r) \tag{4}$$

where $L_2$ is a distance from the light entering surface S11 of the first light-guide plate 11A to an effective utilization region 110, $P_1$ is an interval between the light sources 10 that are equal to each other in a ratio of the minor axis to the major axis, and n is a refractive index of the first light-guide plate 11A, as illustrated in FIG. 9.

For example, "the light sources 10 that are equal in type to each other" may be the light sources 10 that emit the same color light as each other. In one embodiment where three types of light sources 10 that emit respective red light, green light, and blue light are arranged for the light entering surface S11, sets of light sources 10 of the respective colors each may preferably satisfy the above expressions (2) to (4), for example. The term "effective utilization region 110" refers to a region in which the pieces of emission light derived from the respective light sources 10 are mixed with one another and is thus effectively utilizable as a planar-light-emitting source having reduced unevenness. The distance $L_2$ from the light entering surface S11 to the effective utilization region 110 may be equivalent to ⅓ of a light-guide length of the first light-guide plate 11A (in this embodiment, a length along the long side of the first light-guide plate 11A), for example.

The inclination angle θr that satisfies such conditions may be equal to or smaller than about 30 degrees, for example. The inclination angle θr can be larger than 30 degrees; however, excessively large inclination angle θr (for example, equal to or larger than 60 degrees) may result in an increase of directivity in a direction of the interval of the light sources 10 (i.e., in the first direction d1) and may in turn result in easier generation of emission luminance unevenness.

The reflection sheet 12 is a plate-shaped member or a sheet-shaped member provided to oppose the back surface of the first light-guide plate 11A (a main surface opposed to the light exiting surface S12), and serves to return light leaked out from the first light-guide plate 11A (or the second light-guide plate 11B) to the first light-guide plate 11A. The reflection sheet 12 may have one or more functions including reflection, diffusion, and scattering, thereby allowing for effective utilization of light derived from the light sources 10 and an increase in front luminance.

The reflection sheet 12 may be configured of a foamed PET (polyethylene terephthalate) film, a silver deposition film, a multi-layer reflection film, a white PET film, or the like, for example. A surface of the reflection sheet 12 may be preferably subjected to a silver deposition process, an aluminum deposition process, a multi-layer reflection process, or the like for providing the reflection sheet 12 with a function of regular reflection (specular reflection). For providing the reflection sheet 12 with a fine shape, a method using a thermoplastic resin, such as, but not limited to, hot press molding or melt extrusion molding, may be used to form the fine shape integrally with the reflection sheet, or the fine shape may be formed through applying an energy ray (such as, but not limited to, ultraviolet ray) curing resin onto a base material which may be made of PET followed by transferring the shape to the energy ray curing resin, for example. Non-limiting examples of the thermoplastic resin may include a polycarbonate resin (PC), an acrylic resin including PMMA (polymethyl methacrylate) resin, a polyester resin such as polyethylene terephthalate, a non-crystalline copolyester resin such as MS (a copolymer of methyl methacrylate with styrene), a polystyrene resin, and a polyvinyl chloride resin. Also, in one embodiment where the shape is transferred to the energy ray (such as, but not limited to, ultraviolet ray) curing resin, the base material may be a glass.

The optical sheet 13 is provided to oppose the light exiting surface S22 of the second light-guide plate 11B, and may include, for example but not limited to, one or more of a diffusion plate, a diffusion sheet, a lens film, and a polarization separation sheet. Providing such an optical sheet 13 makes it possible to cause light, having exited from the second light-guide plate 11B in an oblique direction, to be directed in a front direction, and thereby to further increase front luminance.

[Function and Effect]

In the backlight unit 1, light having emitted from the light sources 10 and entered the light entering surface S11 of the first light-guide plate 11A travels through the inside of the first light-guide plate 11A and then exits from the light exiting surface S12. On the other hand, light having emitted from the light sources 10 and entered the light entering surface S21 of the second light-guide plate 11B travels through the inside of the second light-guide plate 11B and then exits from the light exiting surface S22. The light having exited from each of the first light-guide plate 11A and the second light-guide plate 11B passes through the optical sheet 13 to be seen as emission light.

Figure 10:
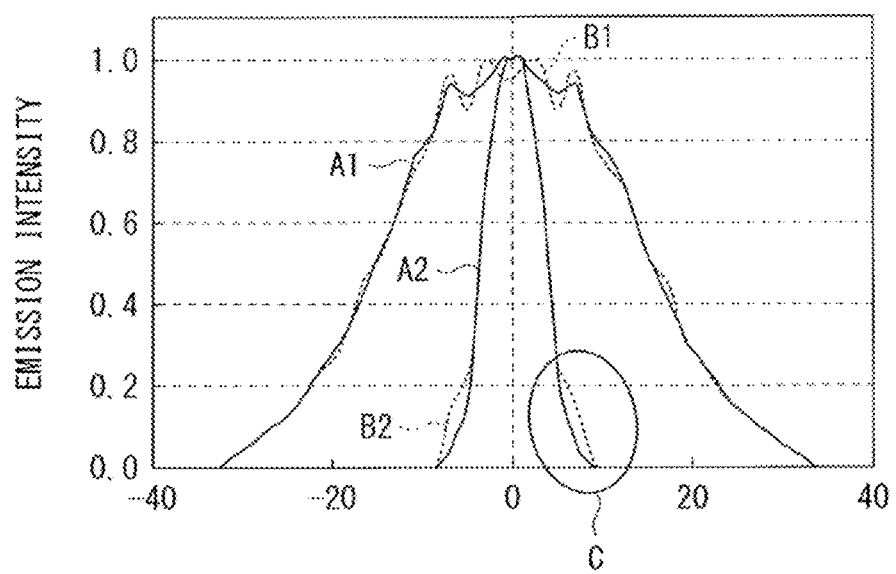
FIG. 10 is a characteristic diagram showing emission intensities of respective light sources that are different in directivity from each other.

As described above, the emission light derived from the light source 10 has the directivity, and hence, the pattern shape $L_P$ of the light applied from the light source 10 to the light entering surface S11 has the shape anisotropy. Such directivity, however, is not the same for all of the pieces of light emitted from the respective light sources 10, and may be different therebetween in minute scales. One example thereof is given with reference to FIG. 10 showing emission intensities of respective two types of light sources that are different in directivity from each other. In the following, the light source that emits light having directivity denoted by solid lines (A1 and A2) is defined as a light source 10A, and the light source that emits light having directivity denoted by dashed lines (B1 and B2) is defined as a light source 10B. The solid line A1 denotes emission intensity in the cross section along the major axis $d_A$ of the emission light derived from the light source 10A, and the solid line A2 denotes emission intensity in the cross section along the minor axis $d_B$ of the emission light derived from the light source 10A. The dashed line B1 denotes emission intensity in the cross section along the major axis $d_A$ of the emission light derived from the light source 10B, and the dashed line B2 denotes emission intensity in the cross section along the minor axis $d_B$ of the emission light derived from the light source 10B.

When the light sources 10A and 10B that are different in directivity of light from each other as described above are arrayed as the light sources 10 for the light entering surfaces S11 and S21, a difference in emission intensity on the minor axis $d_B$ (a difference between the solid line A2 and the dashed line B2, such as a part denoted by C in FIG. 10) particularly influences the entire emission luminance. In the following, a comparison is made, on emission luminance, between a case where the light sources 10A and 10B are so arranged as to have the inclination angle of θr=0° in opposition to each of the light entering surfaces S11 and S21 (the reference arrangement illustrated in FIG. 7A) and a case where the light sources 10A and 10B are so arranged as to have the inclination angle of θr=30° in opposition to each of the light entering surfaces S11 and S21 (the inclined arrangement illustrated in FIG. 7B).

Figure 11A:
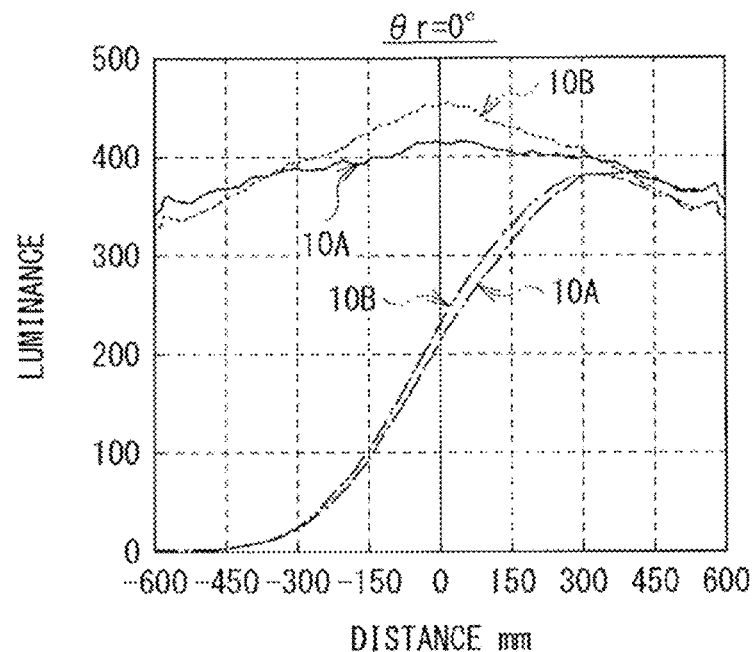
FIG. 11A is a characteristic diagram showing luminance distributions in the reference arrangement.
Figure 11B:
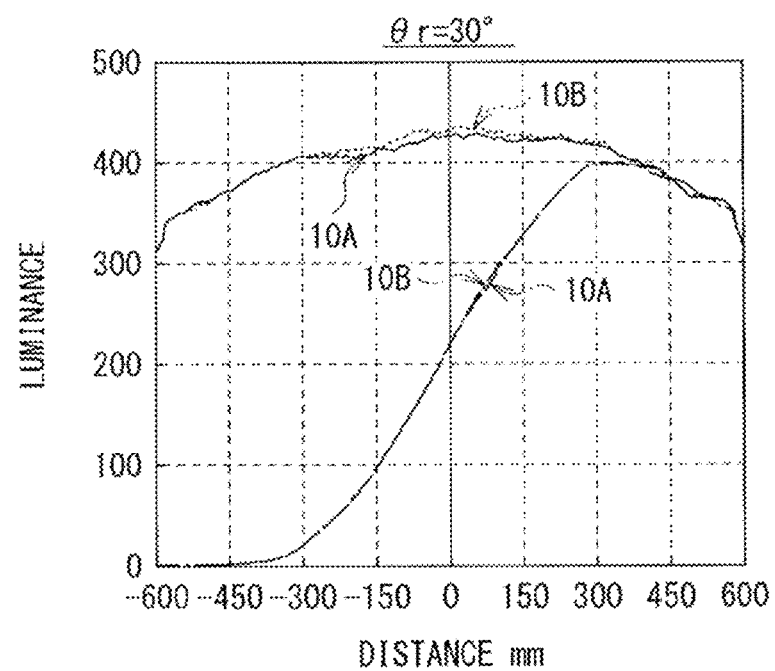
FIG. 11B is a characteristic diagram showing luminance distributions in the inclined arrangement.
Figure 12:
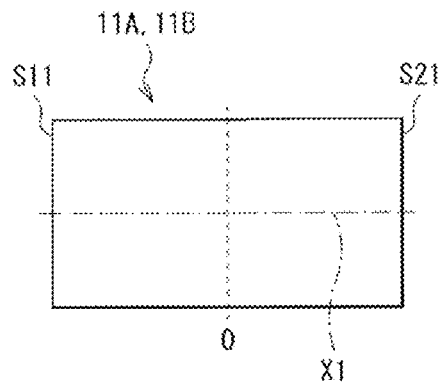
FIG. 12 is a schematic view for describing the distributions in FIGS. 11A and 11B.

FIG. 11A shows luminance distributions in the reference arrangement of the light sources 10A and 10B, and FIG. 11B shows luminance distributions in the inclined arrangement of the light sources 10A and 10B. In FIGS. 11A and 11B, a solid line denotes a luminance distribution where light is incident from both sides (the light entering surfaces S11 and S21) using the light sources 10A, and a one-dot chain line denotes a luminance distribution where light is incident from only one side (the light entering surface S11) using the light sources 10A. Also, a dashed line denotes a luminance distribution where light is incident from both sides (the light entering surfaces S11 and S21) using the light sources 10B, and a two-dot chain line denotes a luminance distribution where light is incident from only one side (the light entering surface S11) using the light sources 10B. It is to be noted that each of the luminance distributions is a luminance distribution on a center line x1 of the first and the second light-guide plates 11A and 11B as illustrated in FIG. 12, where, as for a distance, an intermediate position between the light entering surface S11 and the light entering surface S21 is 0 (zero), and the light entering surface S21 side and the light entering surface S11 side are defined as + (plus) and − (minus), respectively.

It can be seen from FIG. 11A that large variations, especially at the center, occur between the luminance distribution based on the emission light derived from the light source 10A and the luminance distribution based on the emission light derived from the light source 10B when the inclination angle is θr=0°. Hence, even a slight difference in directivity, such as that shown in FIG. 10, leads to generation of luminance unevenness in a light emission plane. Further, when the laser diodes that are different in emission color from one another (such as, but not limited to, red, green, and blue) are arrayed in a mixed fashion for the light entering surfaces S11 and S21, variations in the respective luminance distributions thereof lead to color unevenness in the entire light emission plane.

In contrast, it can be seen from FIG. 11B that the variations are reduced between the luminance distribution based on the emission light derived from the light source 10A and the luminance distribution based on the emission light derived from the light source 10B when the inclination angle is θr=30°. This in turn leads to a reduction in the generation of the luminance unevenness in the light emission plane. Further, the generation of color unevenness is suppressed when the laser diodes that are different in emission color from one another are used for the light sources 10.

Figure 13:
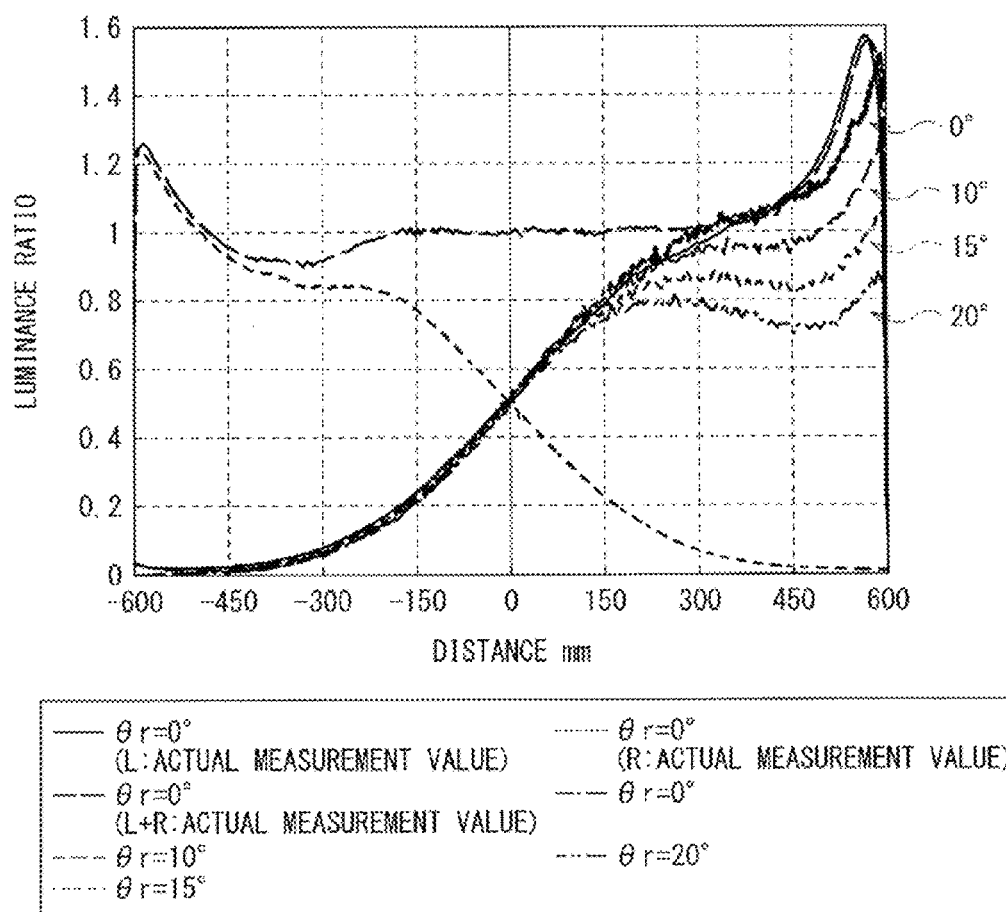
FIG. 13 is a characteristic diagram showing luminance distributions when respective inclination angles are varied.

FIG. 13 shows a result of a simulation of a luminance ratio in each of the cases where the respective inclination angles θr were set to 0°, 10°, 15°, and 20°, for example. The luminance ratio represents a relative luminance where luminance at the center of a light emission plane is defined as 1.0 (0.5 when the light is incident only from one of the light entering surfaces). An actual measurement value is also represented in FIG. 13 for the cases where the inclination angles were each θr=0°, i.e., for the case where light was incident only from the light entering surface S11 side (L: ACTUAL MEASUREMENT VALUE), the case where light was incident only from the light entering surface S21 side (R: ACTUAL MEASUREMENT VALUE), and the case where light was incident from both the light entering surfaces S11 and S21 (L+R: ACTUAL MEASUREMENT VALUE). As can be seen from FIG. 13, in response to the stepwise variation in the inclination angles θr, the corresponding luminance distributions vary in a stepwise fashion accordingly. This means that it is possible to adjust the luminance distribution by adjusting the inclination angle θr. Also, this does not involve excessive increase in sensitivity (a ratio of the variation in the luminance distribution to the variation in the inclination angle θr), allowing for stable adjustment.

Figure 14A:
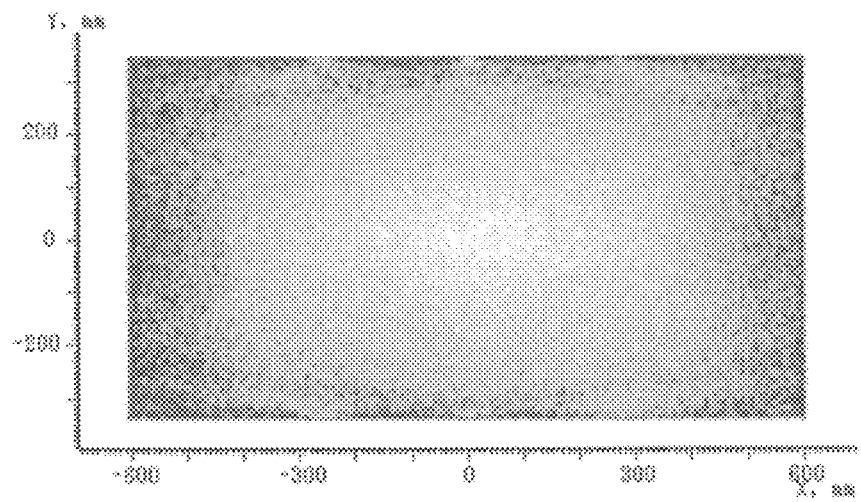
FIG. 14A is a characteristic diagram showing a luminance distribution when the inclination angle is at 30°.
Figure 14B:
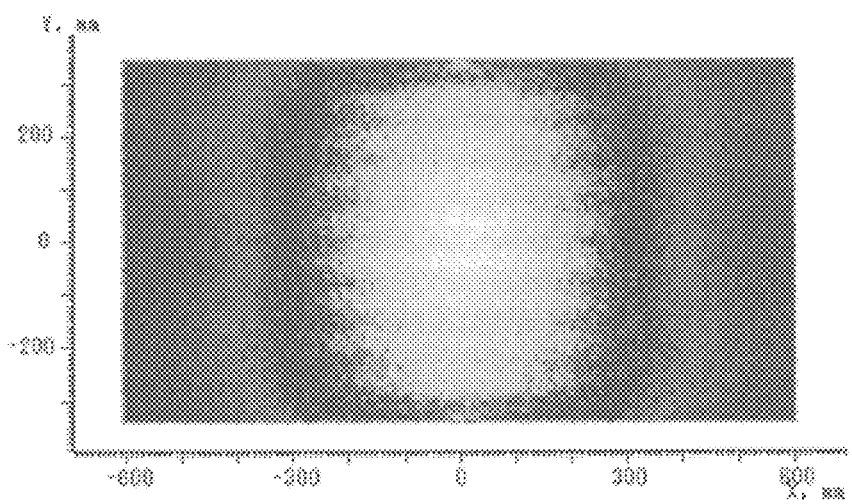
FIG. 14B is a characteristic diagram showing a luminance distribution when the inclination angle is at 60°.

Further, the expressions (1) and (2) to (4) described above may be preferably satisfied in the present embodiment. For example, satisfying those expressions (in the cases of the inclination angle θr=30°, for example) makes it possible to reduce the luminance unevenness in the light emission plane as shown in FIG. 14A. If the above expressions are unsatisfied (in the cases of the inclination angle θr=60°, for example), streaky luminance unevenness is easy to occur in a light emission plane as shown in FIG. 14B.

In the backlight unit 1 according to the present embodiment as described in the foregoing, the plurality of light sources 10 are arrayed in the first direction d1 (in the Y direction) for the light entering surface S11 of the first light-guide plate 11A and the light entering surface S21 of the second light-guide plate 11B. Each of the light sources 10 is disposed to allow the major axis $d_A$ of the pattern shape $L_P$ of the light applied to each of the light entering surfaces S11 and S21 to be inclined from the first direction d1. Thus, even when there is a difference in emission intensity (directivity) between the light sources 10, it is possible to reduce an influence caused by the difference, and to uniformize the luminance distributions derived from the respective light sources 10. Hence, it is possible to reduce luminance unevenness or color unevenness in the light emission plane.

Hereinafter, some modifications of the first embodiment described above and some other example embodiments are described. Note that the same or equivalent elements as those of the first embodiment described above are denoted with the same reference numerals, and will not be described in detail.

[First Modification]

Figure 15:
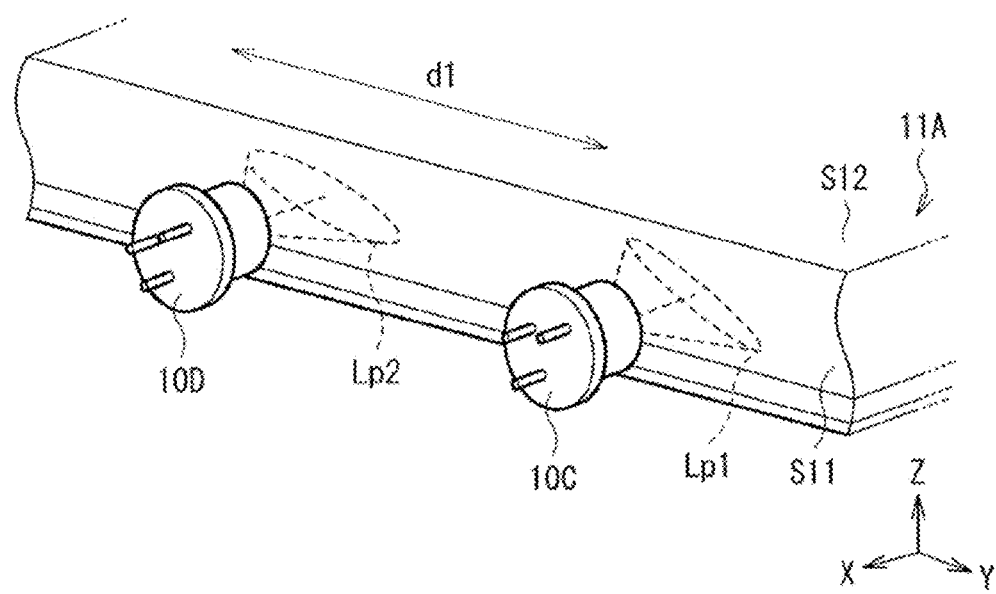
FIG. 15 is a perspective view illustrating an example of arrangement of the light sources according to a first modification.
Figure 16:
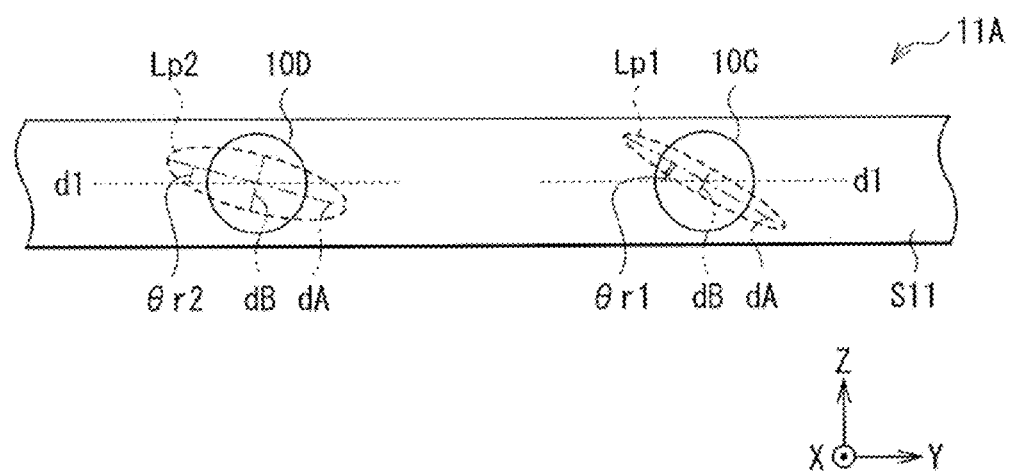
FIG. 16 is a plan view in a Y-Z plane of the light sources and the light-guide plate illustrated in FIG. 15.

FIG. 15 is a perspective view illustrating an example of arrangement of the light sources (light sources 10C and 10D) according to a first modification. FIG. 16 schematically illustrates a planar configuration in a Y-Z plane of the arrangement illustrated in FIG. 15. In the first embodiment, described is the reduction in luminance unevenness by virtue of disposing the light sources 10 for the light entering surface S11 of the first light-guide plate 11A in a turned fashion. In the present modification, two types of light sources 10C and 10D that are different in directivity from each other are given as an example of the light sources 10 in the first embodiment described above, and a magnitude of the inclination angle θr is varied for each of the light sources 10C and 10D, depending on the respective directivities thereof. It is to be noted that the two types of light sources 10C and 10D are given as an example of the light sources 10 different from each other in directivity in the present modification; however, three or more types of light sources may be employed. In one embodiment where the laser diodes that emit red light, green light, and blue light are used, the inclination angles θr of the respective light sources are set depending on the directivities corresponding to the respective colors of light emitted thereby, for example.

In emission light derived from the light source 10C, the ratio (θb/θa) of the half-value angle θb to the half-value angle θa may be relatively small, i.e., the ratio ($d_B/d_A$) of the minor axis $d_B$ to the major axis $d_A$ may be relatively small in the pattern shape $L_{P1}$ derived from the light source 10C, for example. On the other hand, for example, the ratio (θb/θa) of the half-value angle θb to the half-value angle θa may be relatively large in the emission light derived from the light source 10D, i.e., the ratio ($d_B/d_A$) of the minor axis $d_B$ to the major axis $d_A$ may be relatively large in the pattern shape $L_{P2}$ derived from the light source 10D.

In each of the light sources 10C and 10D, the inclination angle θr is so set as to be larger as the above-described ratio (θb/θa) in the emission light is smaller. In the present modification, the ratio (θb/θa) in the emission light derived from the light source 10C is smaller than that in the emission light derived from the light source 10D; hence, the light sources 10C and 10D are so disposed as to allow an inclination angle θr1 of the light source 10C to be larger than an inclination angle θr2 of the light source 10D.

Figure 17:
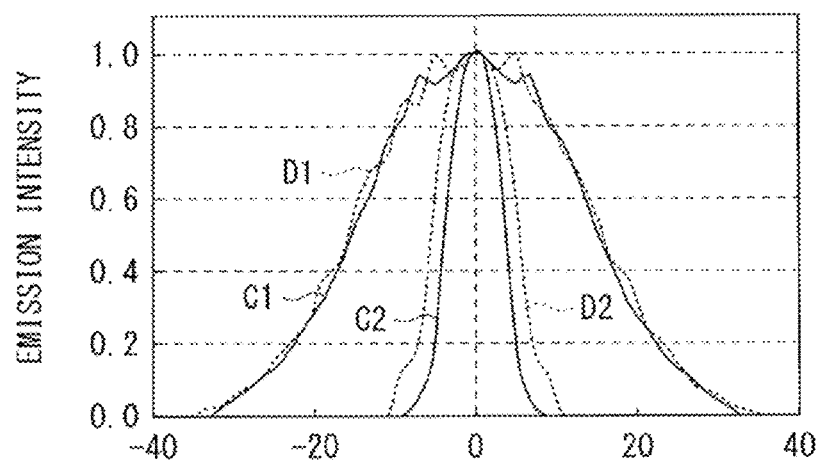
FIG. 17 is a characteristic diagram showing emission intensities of respective light sources that are different in directivity from each other.

FIG. 17 shows emission intensities of the respective light sources 10C and 10D, where the emission intensity of the light source 10C and the emission intensity of the light source 10D are denoted by solid lines (C1 and C2) and dashed lines (D1 and D2), respectively. The solid line C1 denotes emission intensity in the cross section along the major axis $d_A$ of the emission light derived from the light source 10C, and the solid line C2 denotes emission intensity in the cross section along the minor axis $d_B$ of the emission light derived from the light source 10C. The dashed line D1 denotes emission intensity in the cross section along the major axis $d_A$ of the emission light derived from the light source 10D, and the dashed line D2 denotes emission intensity in the cross section along the minor axis $d_B$ of the emission light derived from the light source 10D.

Figure 18A:
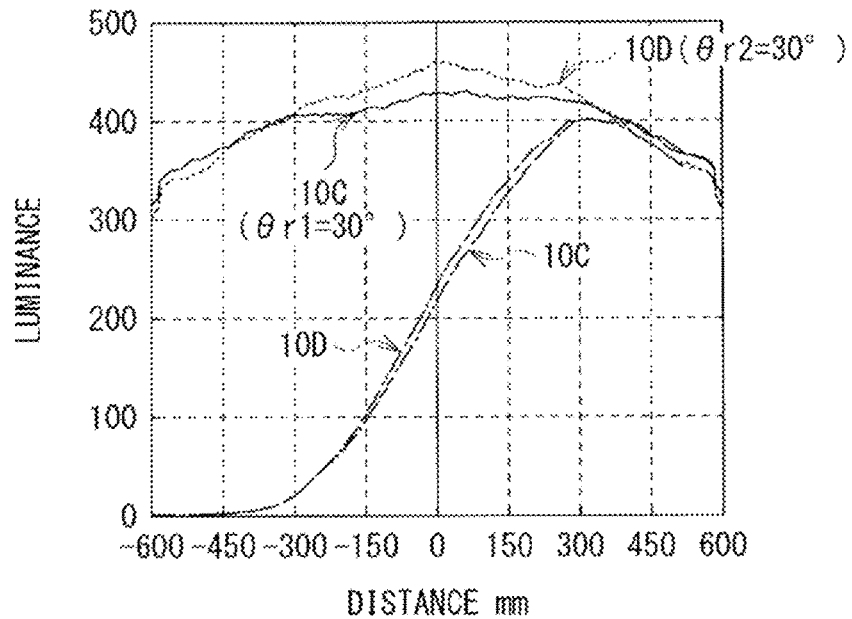
FIG. 18A is a characteristic diagram showing luminance distributions of respective two types of light sources ($\theta r1=\theta r2=30°$) illustrated in FIG. 17.
Figure 18B:
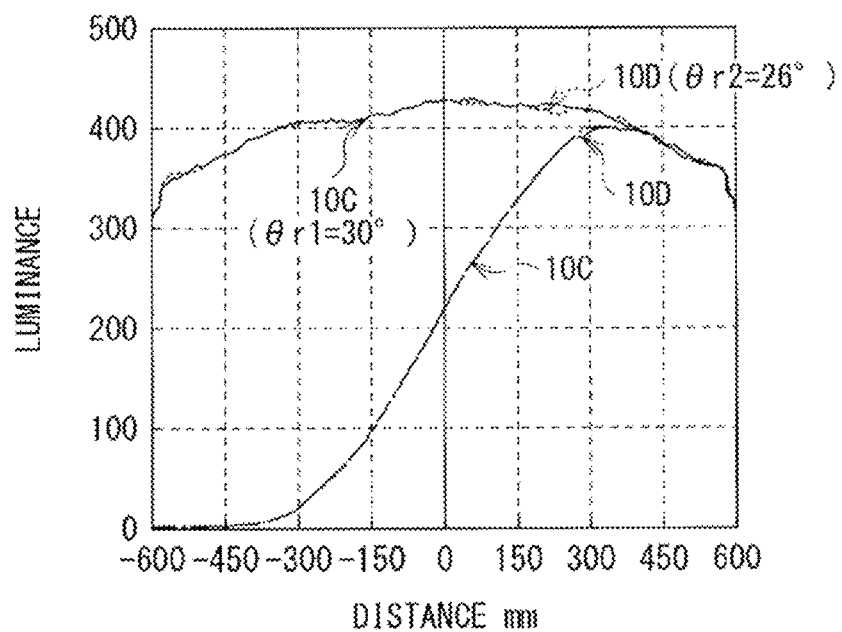
FIG. 18B is a characteristic diagram showing luminance distributions of respective two types of light sources ($\theta r1=30°$ and $\theta r2=26°$) illustrated in FIG. 17.

FIG. 18A shows luminance distributions in the inclined arrangement (θr1=θr2=30°) of the light sources 10C and 10D. FIG. 18B shows luminance distributions in the inclined arrangement (θr1=30° and θr2=26°) of the light sources 10C and 10D. In FIGS. 18A and 18B, a solid line denotes a luminance distribution where light is incident from both sides (the light entering surfaces S11 and S21) using the light sources 10C, and a one-dot chain line denotes a luminance distribution where light is incident from only one side (the light entering surface S11) using the light sources 10C. Also, a dashed line denotes a luminance distribution where light is incident from both sides (the light entering surfaces S11 and S21) using the light sources 10D, and a two-dot chain line denotes a luminance distribution where light is incident from only one side (the light entering surface S11) using the light sources 10D. It is to be noted that each of the luminance distributions is a luminance distribution on the center line x1 of the first and the second light-guide plates 11A and 11B as illustrated in FIG. 12, where, as for a distance, the intermediate position between the light entering surface S11 and the light entering surface S21 is 0 (zero), and the light entering surface S21 side and the light entering surface S11 side are defined as + (plus) and − (minus), respectively.

As shown in FIG. 18A, large variations, especially at the center, occur between the luminance distribution based on the emission light derived from the light source 10C and the luminance distribution based on the emission light derived from the light source 10D when the light sources 10C and 10D are disposed at the same inclination angle as each other. Hence, a difference in directivity, such as that shown in FIG. 17, may lead to generation of luminance unevenness in a light emission plane. Further, when the laser diodes that are different in emission color from one another (such as, but not limited to, red, green, and blue) are arrayed in a mixed fashion for the light entering surfaces S11 and S21, variations in the respective luminance distributions thereof may lead to color unevenness in the entire light emission plane, because the laser diodes that are different in emission color from one another are also different from one another in directivity accordingly.

In contrast, as shown in FIG. 18B, when the inclination angle is set to θr1=30° for the light source 10C whose ratio (θb/θa) is relatively small and the inclination angle is set to θr2=26° for the light source 10D whose ratio (θb/θa) is relatively large, the variations are reduced between the luminance distributions thereof. Hence, setting the inclination angle θr in accordance with the directivity of each of the light sources 10 in a case where, for example, the laser diodes different in emission color from one another are used for the light sources 10, makes it possible to effectively reduce the generation of the luminance unevenness. Further, this in turn makes it possible to suppress the generation of color unevenness.

Second Embodiment

Figure 19:
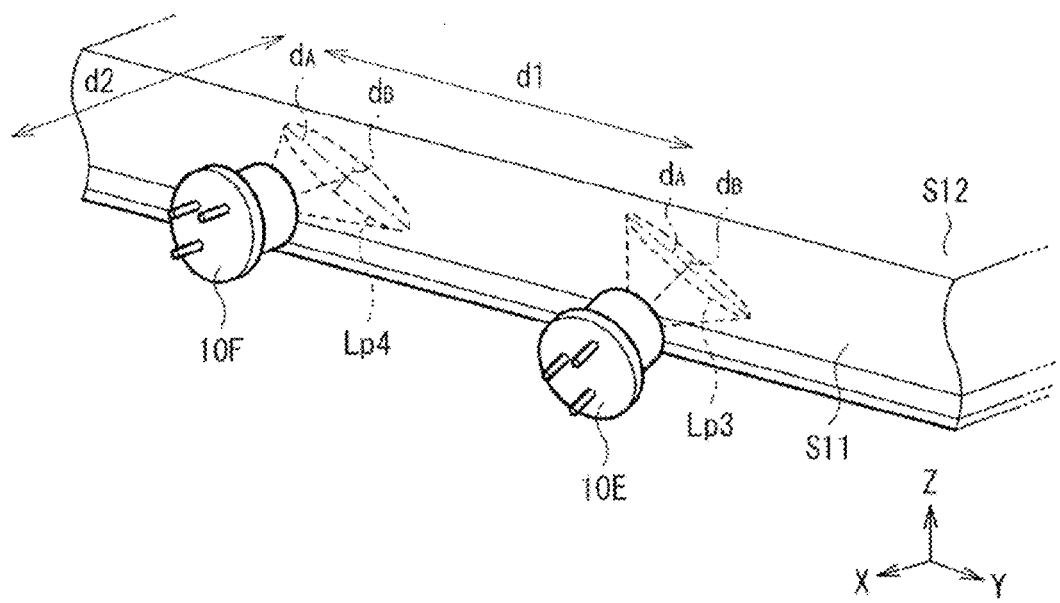
FIG. 19 is a perspective view illustrating an example of arrangement of the light sources according to a second embodiment of the disclosure.
Figure 20A:
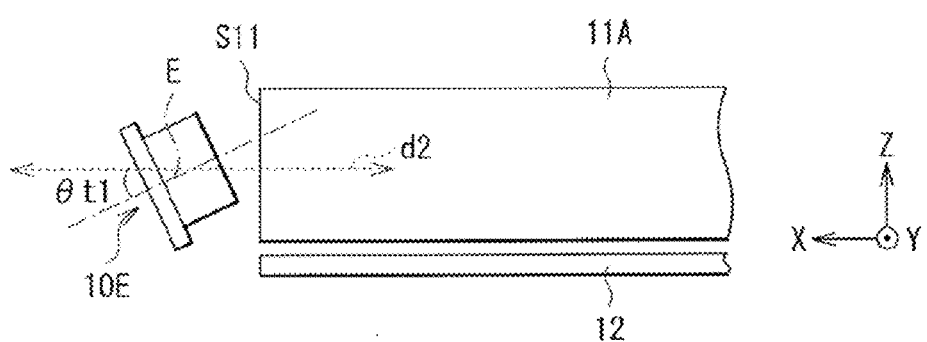
FIG. 20A is a cross-sectional view taken along an X-Z plane of one of the light sources and the light-guide plate illustrated in FIG. 19.
Figure 20B:
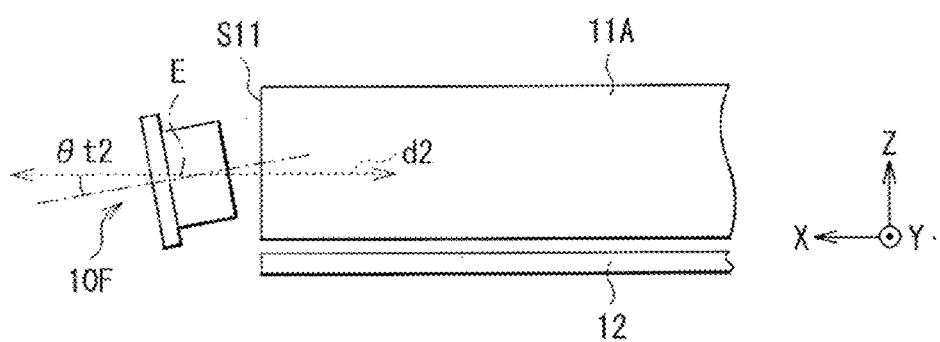
FIG. 20B is a cross-sectional view taken along an X-Z plane of the other of the light sources and the light-guide plate illustrated in FIG. 19.

FIG. 19 is a perspective view illustrating an example of arrangement of the light sources (light sources 10E and 10F) according to a second embodiment. FIG. 20A schematically illustrates a cross-sectional configuration along an X-Z plane of the light source 10E illustrated in FIG. 19, and FIG. 20B schematically illustrates a cross-sectional configuration along an X-Z plane of the light source 10F illustrated in FIG. 19. In the first embodiment and the first modification, the light sources 10 are each so disposed to oppose the light entering surface S11 of the first light-guide plate 11A as to be turned around the optical axis thereof. In the present embodiment, the light sources 10E and 10F that are different in directivity from each other are given as an example of the above-described light sources 10, and are so disposed as to be inclined relative to a second direction d2 (X direction) that is perpendicular to the light entering surface S11 (in a direction of normal of the light entering surface S11). Also, an inclination angle (inclination angle θt) of each of the light sources 10E and 10F may be preferably set in accordance with the respective directivities thereof. It is to be noted that the two types of light sources 10E and 10F are given as an example of the light sources 10 different from each other in directivity in the present embodiment; however, three or more types of light sources may be employed. In one embodiment where the laser diodes that emit red light, green light, and blue light are used, the inclination angles θt of the respective light sources may be set depending on the directivities corresponding to the respective colors of light emitted thereby, for example. In one embodiment, the inclination angle θt corresponds to a specific but non-limiting example of a "second inclination angle".

In emission light derived from the light source 10E, the ratio (θb/θa) of the half-value angle θb to the half-value angle θa may be relatively small, i.e., the ratio ($d_B/d_A$) of the minor axis $d_B$ to the major axis $d_A$ may be relatively small in a pattern shape $L_{P3}$ derived from the light source 10E, for example. On the other hand, for example, the ratio (θb/θa) of the half-value angle θb to the half-value angle θa may be relatively large in the emission light derived from the light source 10F, i.e., the ratio ($d_B/d_A$) of the minor axis $d_B$ to the major axis $d_A$ may be relatively large in a pattern shape $L_{P4}$ derived from the light source 10F.

In each of the light sources 10E and 10F, the inclination angle θt is so set as to be larger as the above-described ratio (θb/θa) in the emission light is smaller. In the present embodiment, the ratio (θb/θa) in the emission light derived from the light source 10E is smaller than that in the emission light derived from the light source 10F; hence, the light sources 10E and 10F are so disposed as to allow an inclination angle θt1 of the light source 10E to be larger than an inclination angle θt2 of the light source 10F. In one example to be described later, the inclination angles may be θt1=3° and θt2=0°. Hence, in the present embodiment, one of the inclination angles (for example, the inclination angle θt2) may be set to 0 (zero) degree, meaning that both the inclination angles θt1 and θt2 do not necessarily have to be set so as to be larger than 0 (zero) degree. As in the first embodiment described above, the light sources 10E and 10F in the present embodiment are also so disposed as to allow the major axis $d_A$ of each of the pattern shapes $L_{P3}$ and $L_{P4}$ to be inclined relative to the first direction d1.

Figure 21:
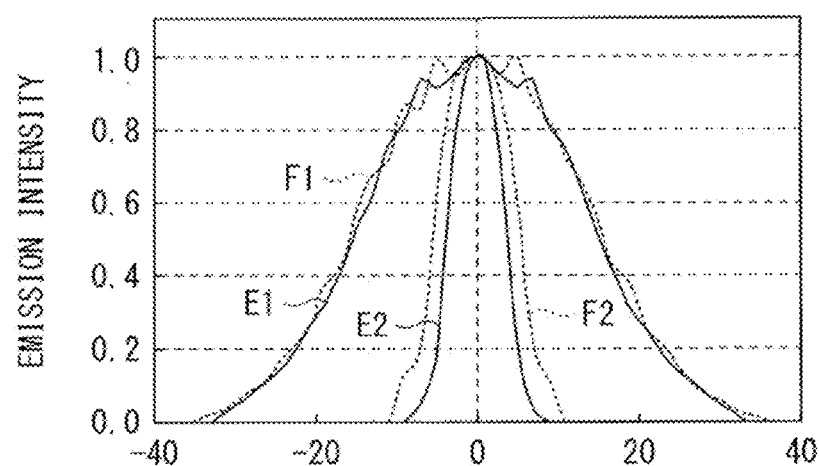
FIG. 21 is a characteristic diagram showing emission intensities of respective light sources that are different in directivity from each other.

FIG. 21 shows emission intensities of the respective light sources 10E and 10F, where the emission intensity of the light source 10E and the emission intensity of the light source 10F are denoted by solid lines (E1 and E2) and dashed lines (F1 and F2), respectively. The solid line E1 denotes emission intensity in the cross section along the major axis $d_A$ of the emission light derived from the light source 10E, and the solid line E2 denotes emission intensity in the cross section along the minor axis $d_B$ of the emission light derived from the light source 10E. The dashed line F1 denotes emission intensity in the cross section along the major axis $d_A$ of the emission light derived from the light source 10F, and the dashed line F2 denotes emission intensity in the cross section along the minor axis $d_B$ of the emission light derived from the light source 10F.

Figure 22A:
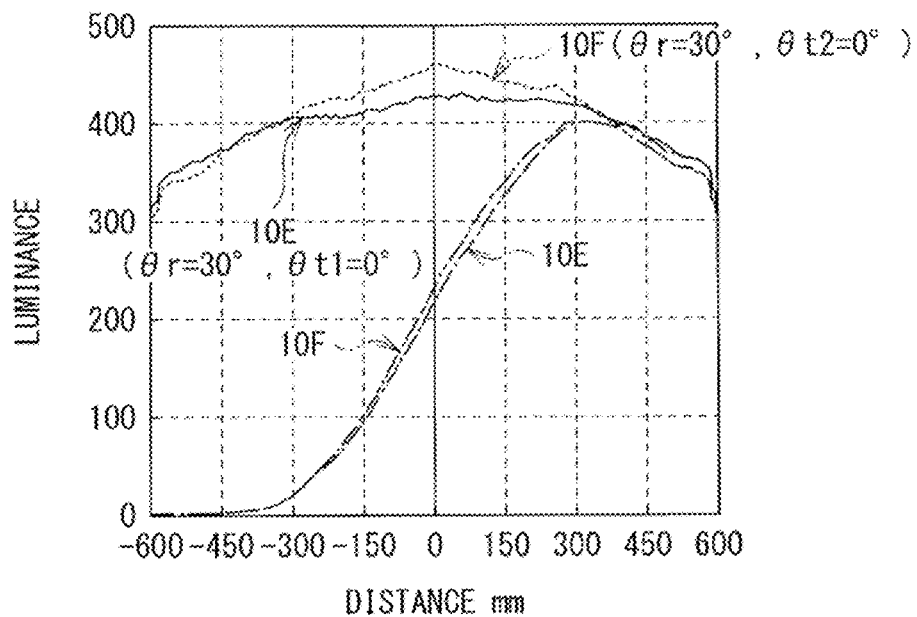
FIG. 22A is a characteristic diagram showing luminance distributions of respective two types of light sources ($\theta r=30°$ and $\theta t1=\theta t2=0°$) illustrated in FIG. 21.
Figure 22B:
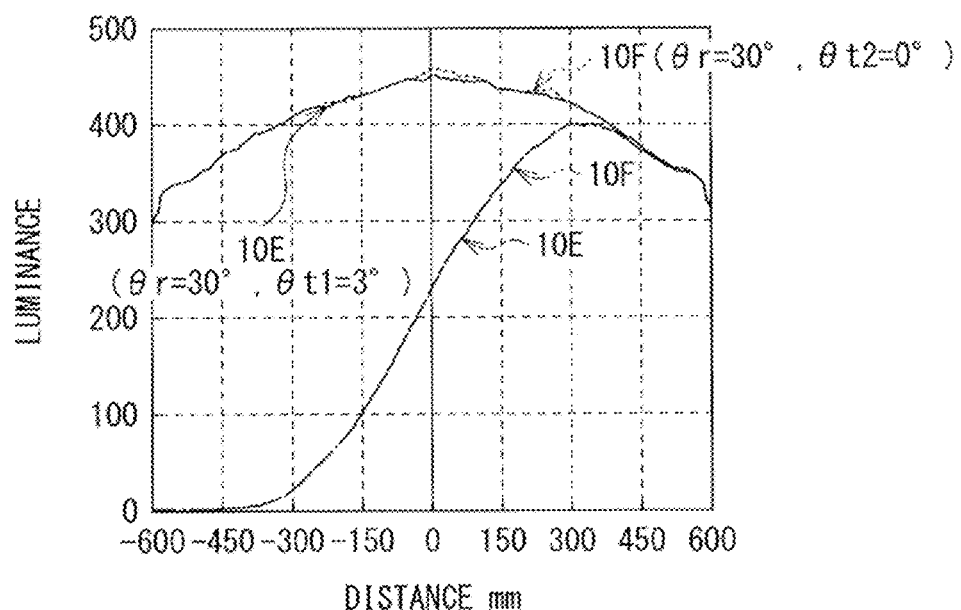
FIG. 22B is a characteristic diagram showing luminance distributions of respective two types of light sources ($\theta r=30°$, $\theta t1=3°$, and $\theta t2=0°$) illustrated in FIG. 21.

FIG. 22A shows luminance distributions in the inclined arrangement (θr=30° and θt1=θt2=0°) of the light sources 10E and 10F. FIG. 22B shows luminance distributions in the inclined arrangement (θr=30°, θt1=3°, and θt2=0°) of the light sources 10E and 10F. In FIGS. 22A and 22B, a solid line denotes a luminance distribution where light is incident from both sides (the light entering surfaces S11 and S21) using the light sources 10E, and a one-dot chain line denotes a luminance distribution where light is incident from only one side (the light entering surface S11) using the light sources 10E. Also, a dashed line denotes a luminance distribution where light is incident from both sides (the light entering surfaces S11 and S21) using the light sources 10F, and a two-dot chain line denotes a luminance distribution where light is incident from only one side (the light entering surface S11) using the light sources 10F. It is to be noted that each of the luminance distributions is a luminance distribution on the center line x1 of the first and the second light-guide plates 11A and 11B as illustrated in FIG. 12, where, as for a distance, the intermediate position between the light entering surface S11 and the light entering surface S21 is 0 (zero), and the light entering surface S21 side and the light entering surface S11 side are defined as + (plus) and – (minus), respectively.

As shown in FIG. 22A, even when the light sources 10E and 10F are each disposed at the inclination angle θr of 30 degrees, large variations, especially at the center, occur between the luminance distribution based on the emission light derived from the light source 10E and the luminance distribution based on the emission light derived from the light source 10F when the inclination angles θt1 and θt2 are both at 0 (zero) degree. Hence, a difference in directivity, such as that shown in FIG. 21, may lead to generation of luminance unevenness in a light emission plane. Further, when the laser diodes that are different in emission color from one another (such as, but not limited to, red, green, and blue) are arrayed in a mixed fashion for the light entering surfaces S11 and S21, variations in the respective luminance distributions thereof may lead to color unevenness in the entire light emission plane.

In contrast, as shown in FIG. 22B, when the inclination angle is set to θt1=3° for the light source 10E whose ratio (θb/θa) is relatively small and the inclination angle is set to θt2=0° for the light source 10F whose ratio (θb/θa) is relatively large, the variations are reduced between the luminance distributions thereof. Hence, it is possible to reduce the generation of the luminance unevenness as in the first embodiment and the first modification described above. Further, it is possible to suppress the generation of color unevenness when the plurality of types of laser diodes different in emission color from one another are used for the light sources 10.

It is also possible to achieve effects equivalent to those of the first embodiment described above when the light sources 10 are disposed such that the respective optical axes are inclined relative to the second direction d2 as described in the present embodiment. Also, the inclined arrangement in the first embodiment and the inclined arrangement in the present embodiment may be combined.

Figure 23:
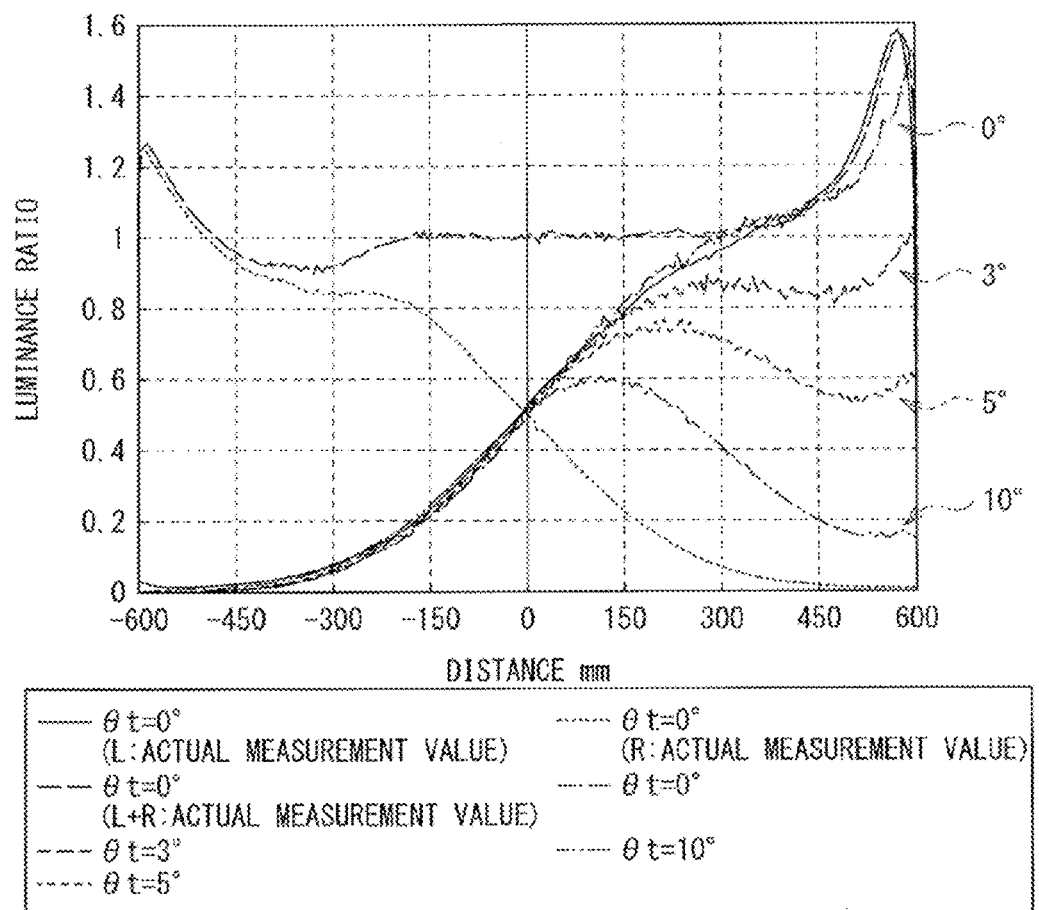
FIG. 23 is a characteristic diagram showing luminance distributions when respective inclination angles are varied.

FIG. 23 shows a result of a simulation of a luminance ratio in each of the cases where the respective inclination angles θt were set to 0°, 3°, 5°, and 10°, for example. The luminance ratio represents a relative luminance where luminance at the center of a light emission plane is defined as 1.0 (0.5 when the light is incident only from one of the light entering surfaces). An actual measurement value is also represented in FIG. 23 for the cases where the inclination angles were each θt=0°, i.e., for the case where light was incident only from the light entering surface S11 side (L: ACTUAL MEASUREMENT VALUE), the case where light was incident only from the light entering surface S21 side (R: ACTUAL MEASUREMENT VALUE), and the case where light was incident from both the light entering surfaces S11 and S21 (L+R: ACTUAL MEASUREMENT VALUE). As can be seen from FIG. 23, in response to the stepwise variation in the inclination angles θt, the corresponding luminance distributions vary in a stepwise fashion accordingly, as in the inclination angles θr as described above. This means that it is also possible to adjust the luminance distribution by adjusting the inclination angle θt. However, adjusting the inclination angle θt may increase sensitivity (a ratio of the variation in the luminance distribution to the variation in the inclination angle θt) significantly; hence, the adjustment of the inclination angle θt may be preferably performed as an auxiliary way for the adjustment that uses the inclination angle θr. For example, as in the present embodiment, the inclination angles θr may be adjusted at respective predetermined angles to reduce the variations in the luminance distribution, following which fine tuning of the inclination angles θt may be performed to achieve further uniform luminance distribution.

Example

Figure 24A:
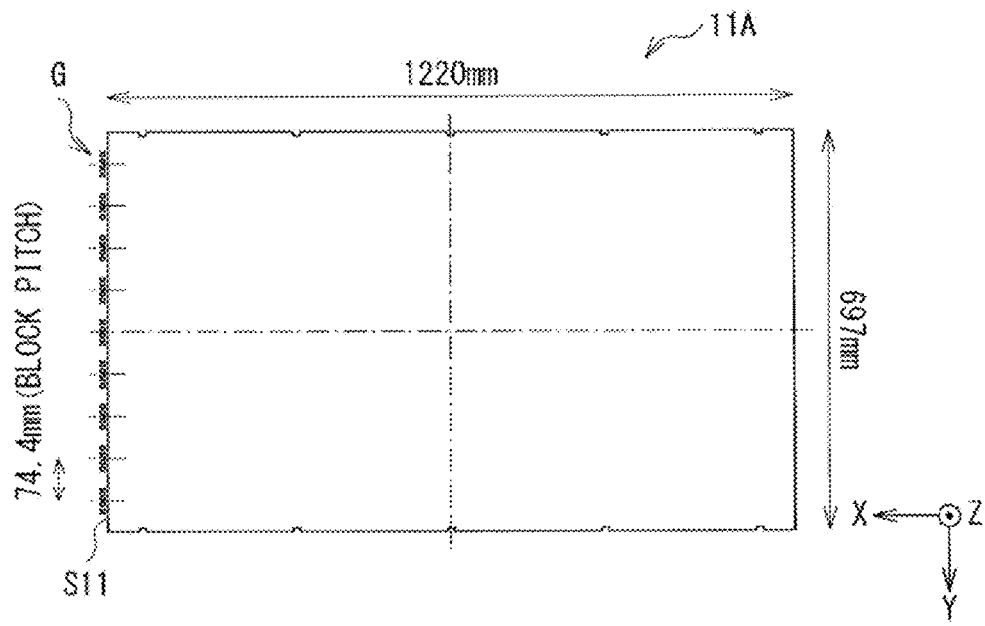
FIG. 24A is a plan view in an X-Y plane illustrating a design example of the light sources and the first light-guide plate according to Example.
Figure 24B:
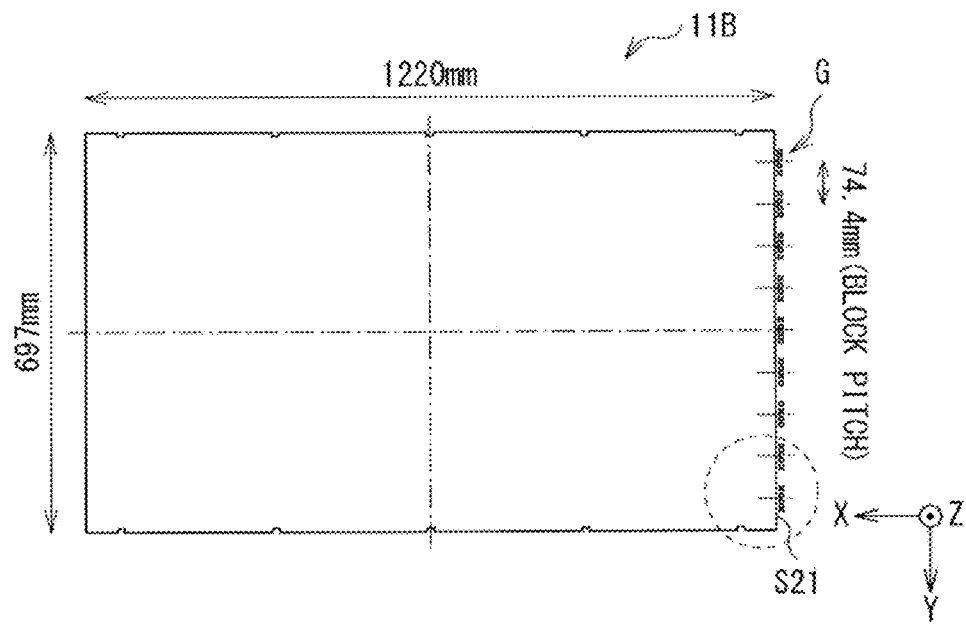
FIG. 24B is a plan view in an X-Y plane illustrating a design example of the light sources and the second light-guide plate according to Example.
Figure 25:
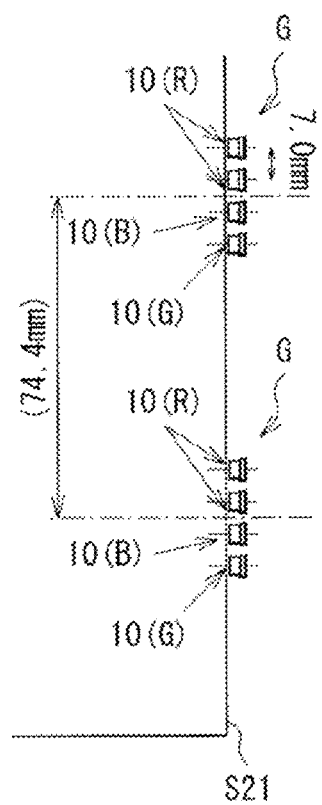
FIG. 25 is a plan view in an X-Y plane illustrating part of FIG. 24B in an enlarged manner.

FIGS. 24A and 24B each illustrate a design example of the light sources 10, the first light-guide plate 11A, and the second light-guide plate 11B described in each of the first embodiment, the first modification, and the second embodiment. FIG. 25 illustrates a region surrounded by a dashed line illustrated in FIG. 24B in an enlarged manner. As illustrated in the drawings, the first light-guide plate 11A and the second light-guide plate 11B each may be rectangular in an XY planar shape whose short side may be 697 mm, long side may be 1220 mm, and a thickness may be 2 mm, for example. In the first light-guide plate 11A and the second light-guide plate 11B, light source blocks G, each including a set of light sources 10, are disposed at a predetermined pitch (block pitch) for the light entering surfaces S11 and S21. For example, the block pitch may be 74.4 mm. In each light source block G, two light sources 10(R), one light source 10(G), and one light source 10(B) may be disposed at a predetermined pitch (for example, 7.0 mm), for example.

The light source 10(R) is a laser diode that emits red light, the light source 10(G) is a laser diode that emits green light, and the light source 10(B) is a laser diode that emits blue light. In one embodiment where the laser diode that are different in emission color from one another are used as in the light sources 10(R), 10(G), and 10(B), the inclination angles θr (or the inclination angles θt) of the respective light sources 10(R), 10(G), and 10(B) may be set in accordance with their respective directivities. For example, so disposing the light sources 10(R), 10(G), and 10(B) as to set the inclination angle of θr=12° for the light source 10(R), the inclination angle of θr=26° for the light source 10(G), and the inclination angle of θr=30° for the light source 10(B) makes it possible to reduce the luminance unevenness or the color unevenness as described above.

[Second Modification]

Figure 26:
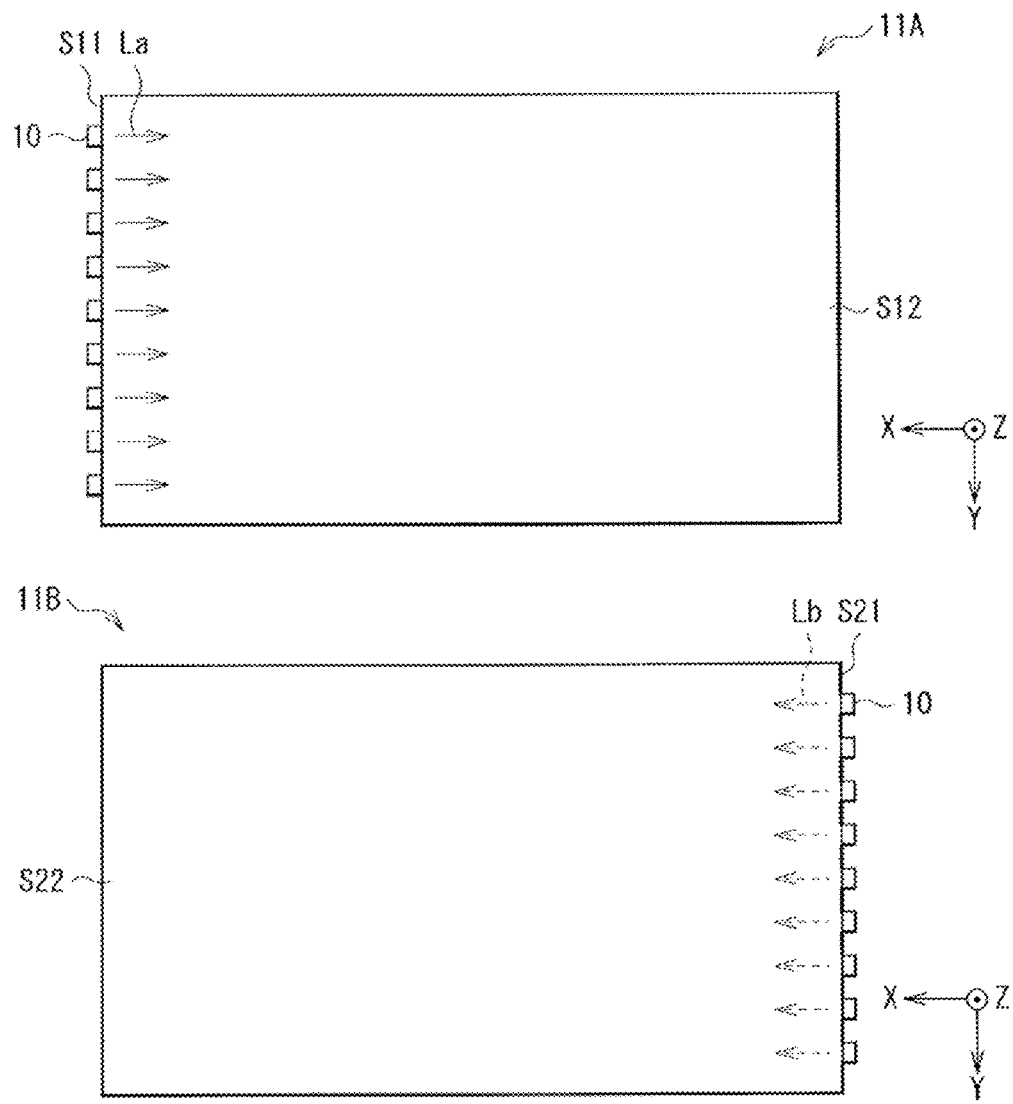
FIG. 26 is a schematic plan view illustrating an example of arrangement of the light sources according to a second modification.

FIG. 26 is a schematic plan view illustrating another example of arrangement of the light sources 10 in any of the example embodiments and the modifications described above. In the first embodiment, described is an example where the plurality of light sources 10 are disposed to oppose each of the light entering surface S11 of the first light-guide plate 11A and the light entering surface S21 of the second light-guide plate 11B. In the present modification, positions at which the respective light sources 10 are provided are offset from one another between the first light-guide plate 11A and the second light-guide plate 11B. In one embodiment, the positions of the respective light sources 10 are so shifted as to dispose the light sources 10 that are opposed to the light entering surface S11 (first light sources) and the light sources 10 that are opposed to the light entering surface S21 (second light sources) on axes different from one another in a plane parallel to the light emission plane (so shifted as to prevent respective optical axes from being overlapped with one another).

Figure 27:
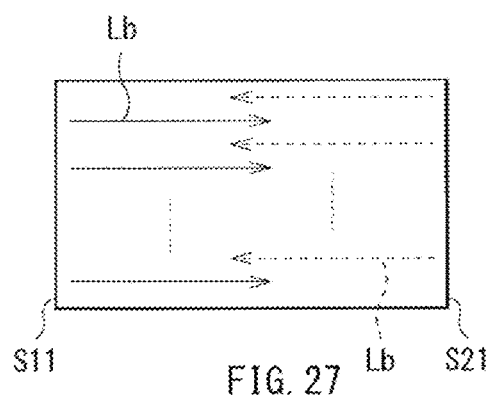
FIG. 27 is a schematic view for describing an effect achieved by the configuration illustrated in FIG. 26.

This allows the light La having entered from the light entering surface S11 and the light Lb having entered from the light entering surface S21 to travel along respective lines that are staggered in the plane parallel to the light emission plane as schematically illustrated in FIG. 27. Hence, it is possible to reduce the streaky luminance unevenness in the light emission plane.

[Third Modification]

Figure 28:
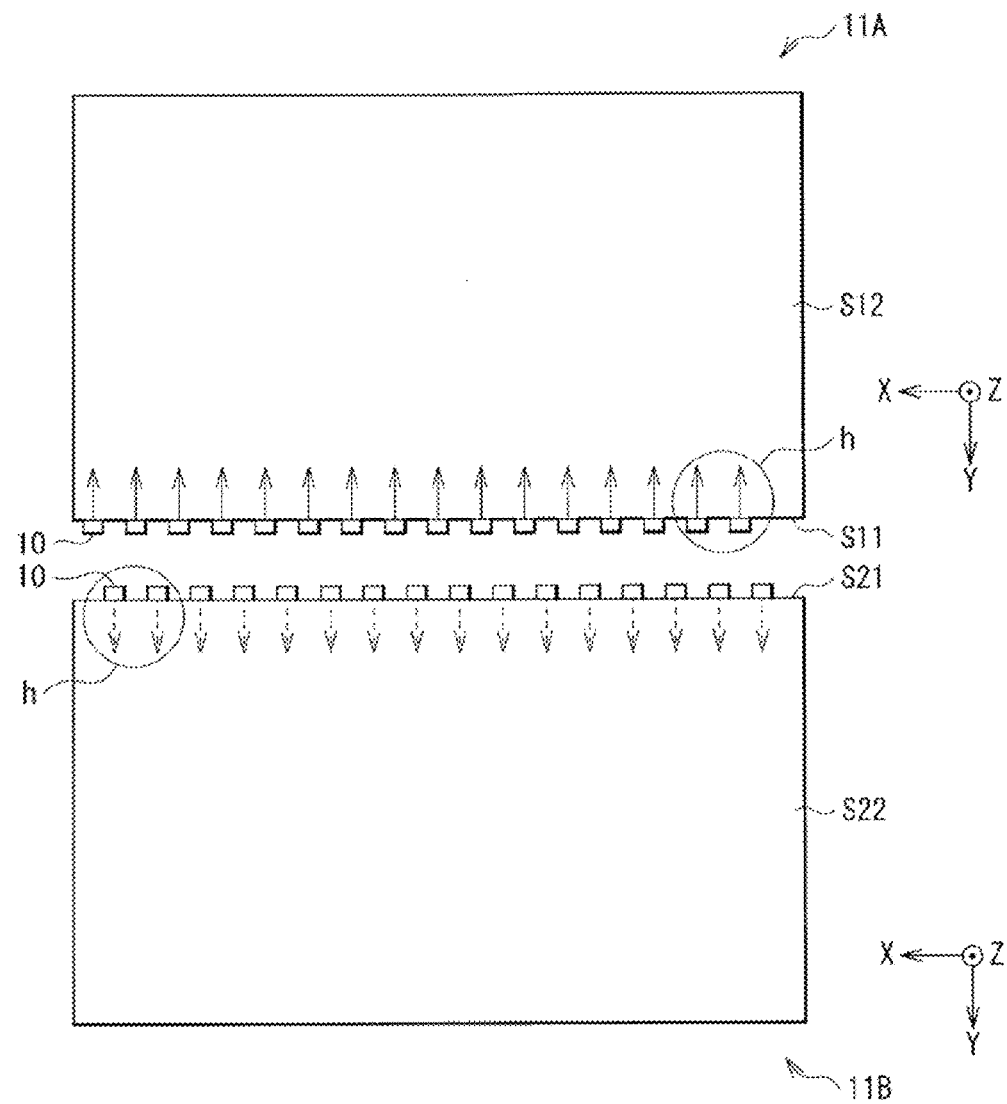
FIG. 28 is a schematic plan view illustrating an example of arrangement of the light sources according to a third modification.
Figure 29:
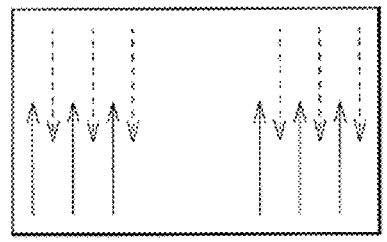
FIG. 29 is a schematic view for describing an effect achieved by the configuration illustrated in FIG. 28.

FIG. 28 is a schematic plan view illustrating another example of arrangement of the light sources 10 in any of the example embodiments and the modifications described above. In the first embodiment described above, the light entering surfaces S11 and S21 are each the side surface corresponding to the short side of the rectangular shape of the first light-guide plate 11A or the second light-guide plate 11B. However, as in the present modification, the light entering surfaces S11 and S21 each may be a side surface corresponding to long side of the rectangular shape of the first light-guide plate 11A or the second light-guide plate 11B. Additionally, as in the second modification described above, the positions of the respective light sources 10 may also be offset from one another between the first light-guide plate 11A and the second light-guide plate 11B in the present modification. Hence, it is possible to reduce the streaky luminance unevenness as shown in FIG. 29.

Figure 30A:
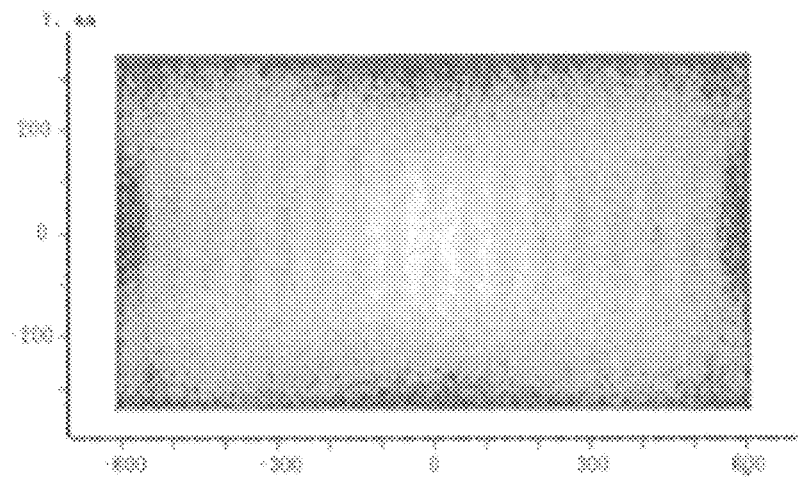
FIG. 30A shows an example of an emission luminance distribution when no offset is performed in the configuration illustrated in FIG. 28.
Figure 30B:
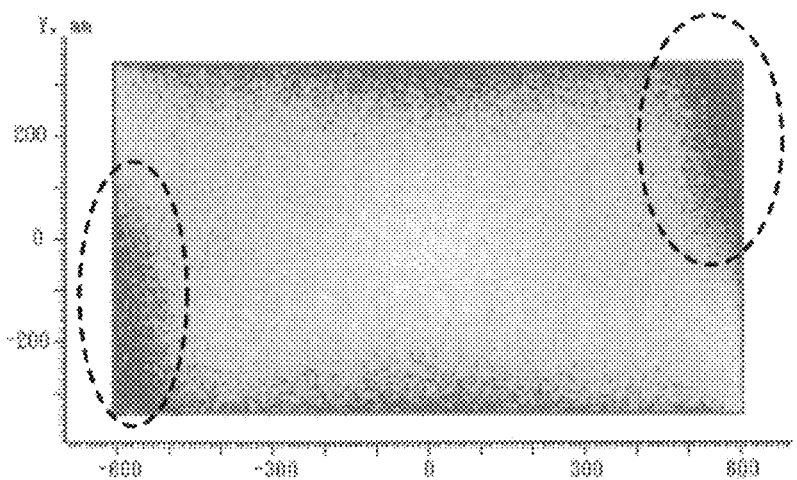
FIG. 30B shows an example of an emission luminance distribution when offset is performed in the configuration illustrated in FIG. 28.

FIGS. 30A and 30B each show an example of emission luminance where the light entering surfaces S11 and S21 are provided corresponding to the respective long sides, in which FIG. 30A shows a luminance distribution where the positions of the light sources 10 are not offset, and FIG. 30B shows a luminance distribution where the positions of the light sources 10 are offset. When the positions of the light sources 10 are offset from one another in providing the light entering surfaces S11 and S21 corresponding to the respective long sides, insufficiency of a light amount occurs at particular corners of a light emission plane (for example, at portions surrounded by dashed lines) as compared with no offsetting of the light source positions, causing local darkness. Hence, outputs of the respective light sources 10 corresponding to the portions (regions "h" in FIG. 28) may be selectively increased to compensate for the light amount in those local portions.

[Fourth Modification]

Figure 31:
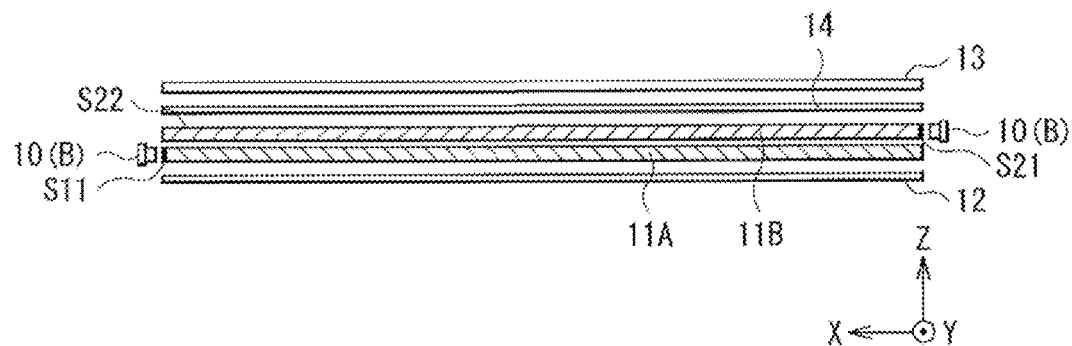
FIG. 31 is a cross-sectional view illustrating an outline configuration of the backlight unit according to a fourth modification.

FIG. 31 illustrates a cross-sectional configuration of the backlight unit according to a fourth modification. In the example embodiments and the modifications described above, exemplified is a configuration in which the laser diodes that emit red light, green light, and blue light are used as the plurality of light sources 10; however, monochromatic laser diodes may be used as in the present modification. In one embodiment, light sources 10(B) each configured of a laser diode that emits blue light may be so arrayed as to oppose each of the light entering surface S11 of the first light-guide plate 11A and the light entering surface S21 of the second light-guide plate 11B. For example, the inclination angle θr of the light source 10(B) may be 30 degrees. Further, a wavelength conversion sheet 14 is provided between the light exiting surface S22 of the second light-guide plate 11B and the optical sheet 13. The wavelength conversion sheet 14 may contain a fluorescent material that converts part of a wavelength of the blue light into another wavelength of light, such as, but not limited to, red light, green light, or yellow light, for example, thus allowing for color mixing of the blue light and the light following the wavelength conversion to obtain emission of white light, for example.

[Fifth Modification]

Figure 32:
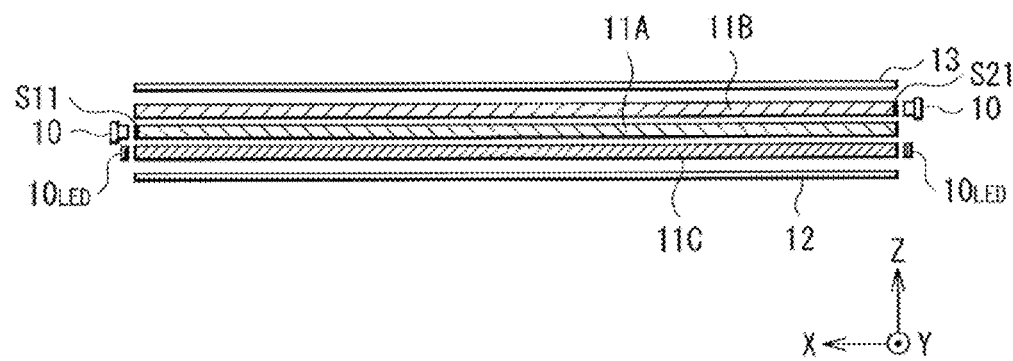
FIG. 32 is a cross-sectional view illustrating an outline configuration of the backlight unit according to a fifth modification.

FIG. 32 illustrates a cross-sectional configuration of the backlight unit according to a fifth modification. In the example embodiments and the modifications described above, exemplified is a configuration in which the laser diodes are used as the light sources 10; however, the laser diodes and light-emitting diodes may be used in combination as in the present modification. In one embodiment, a light source 10(R) including a laser diode that emits red light and a light source $10_{LED}$ including a light-emitting diode that emits color light of cyan (C) may be used, for example. The light source $10_{LED}$ may have a configuration in which a light-emitting diode chip that emits blue light and a green phosphor (phosphor that performs wavelength conversion from blue to green) are combined, for example. For example, the inclination angle θr of the light source 10(R) may be 12 degrees.

The light sources 10(R) may be so arrayed as to oppose each of the light entering surface S11 of the first light-guide plate 11A and the light entering surface S21 of the second light-guide plate 11B, for example. A third light-guide plate 11C is further provided between the first light-guide plate 11A and the reflection sheet 12. The light sources $10_{LED}$ are provided to oppose side surfaces of the third light-guide plate 11C. It is to be noted that the light sources $10_{LED}$ are provided for the opposing two side surfaces of the third light-guide plate 11C; hence, the density of dots in the dot pattern described above may vary in a stepwise fashion in the third light-guide plate 11C, from low (rough) to high (dense) and then to low (rough) as going from one of the side surfaces (light entering surface) of the third light-guide plate 11C to the other side surface (light entering surface), for example.

APPLICATION EXAMPLES

Figure 33:
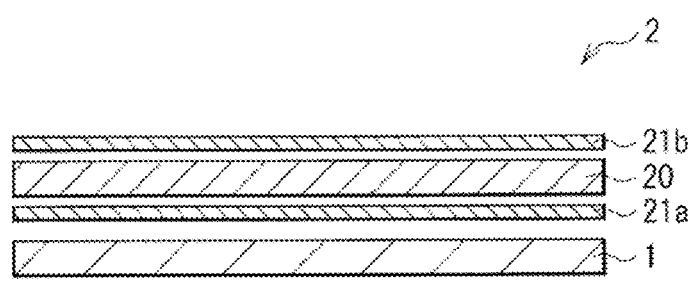
FIG. 33 schematically illustrates an outline configuration of a display according to an application example.

The backlight unit 1 as described above may be incorporated in a display 2 as illustrated in FIG. 33 to be applied to any of the following electronic apparatuses, for example. The display 2 may be, for example but not limited to, a liquid crystal display. The display 2 may have a configuration in which polarizers 21a and 21b are stacked on light entering side and light exiting side of the liquid crystal panel 20, respectively, and the backlight unit 1 illuminates the liquid crystal panel 20 from the backside thereof, for example. Non-limiting examples of the electronic apparatuses may include a television set, an electronic book, a smartphone, a digital camera, a notebook personal computer, a video camera, and a mobile phone as described below. In other words, the display 2 in which the backlight unit 1 described above is used is applicable to an electronic apparatus in any field directed to displaying of externally-received or internally-generated image signals as still or video images.

Application Example 1

Figure 34:
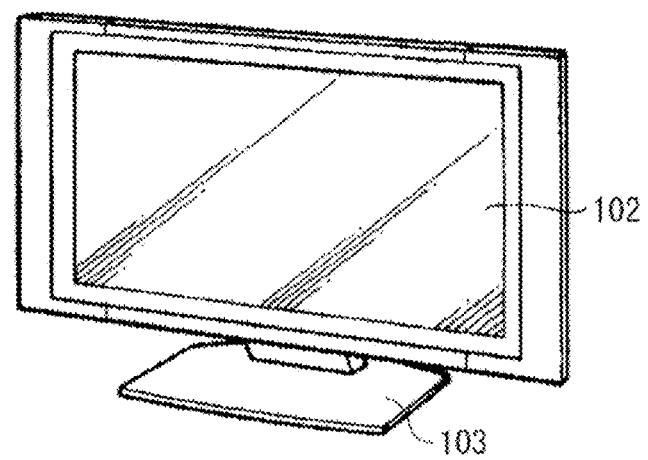
FIG. 34 is a perspective view illustrating appearance of a television set.

FIG. 34 illustrates an embodiment where the display 2 is used as a television set. The television set may have a configuration in which a plate-shaped main body 102 for image display is supported by a stand 103. The television set may be placed on a horizontal surface such as a floor, a shelf, or a rack while the stand 103 is attached to the main body 102 to be used as a floor-standing television set, or may be used also as a wall-hanging television set in which the stand 103 is removed from the main body 102. The main body 102 includes the display 2 as described above.

Application Example 2

Figure 35A:
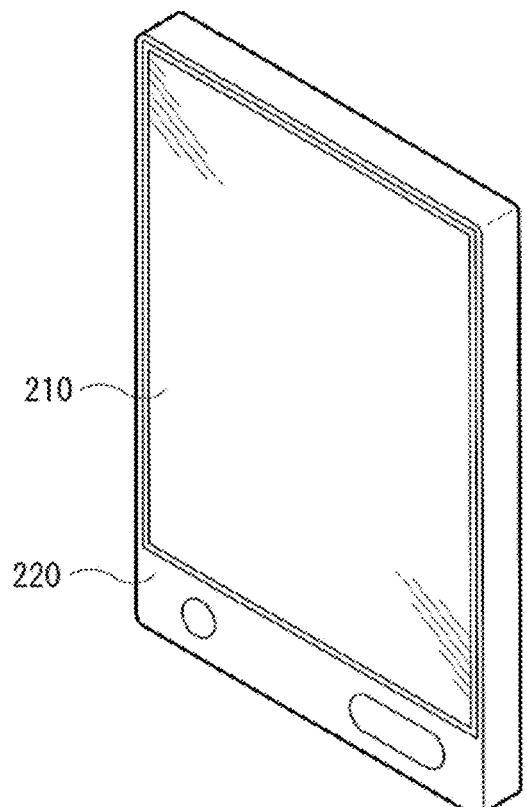
FIG. 35A is a perspective view illustrating appearance of an electronic book.
Figure 35B:
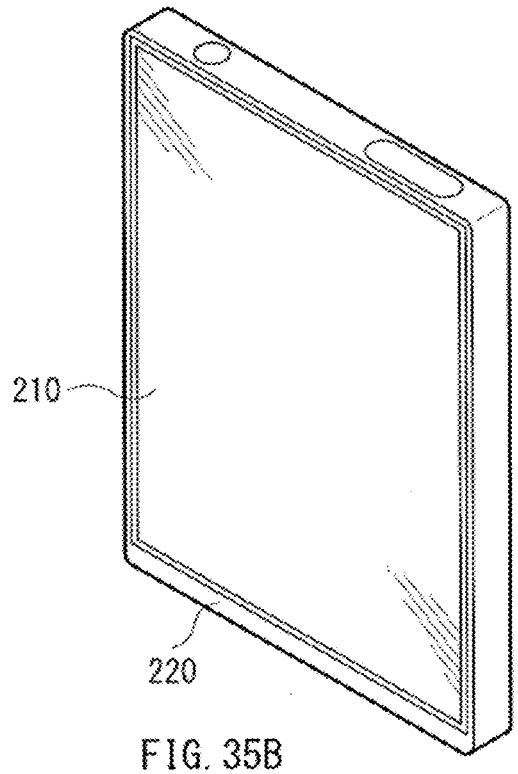
FIG. 35B is a perspective view illustrating appearance of another electronic book.

FIG. 35A illustrates appearance of an electronic book, whereas FIG. 35B illustrates appearance of another electronic book. Each of such electronic books may include, for example, a display section 210 and a non-display section 220. The display section 210 is configured of the display 2 as described above.

Application Example 3

Figure 36:
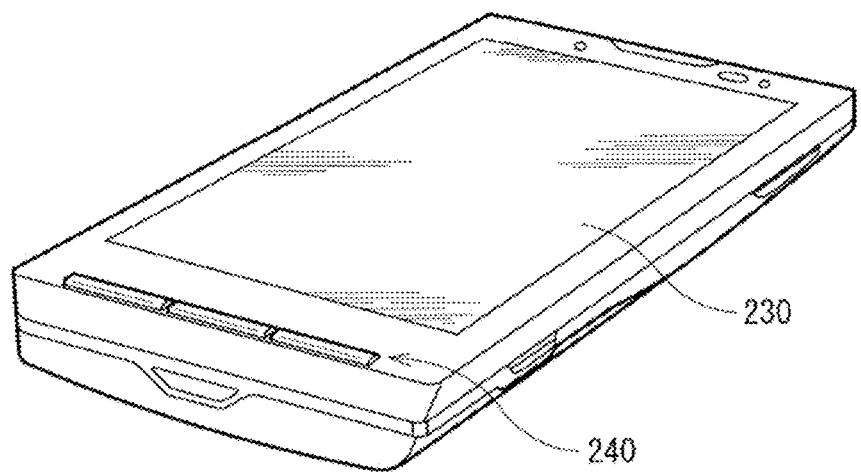
FIG. 36 is a perspective view illustrating appearance of a smartphone.

FIG. 36 illustrates appearance of a smartphone. The smartphone may include, for example, a display section 230 and a non-display section 240. The display section 230 is configured of the display 2 as described above.

Application Example 4

Figure 37A:
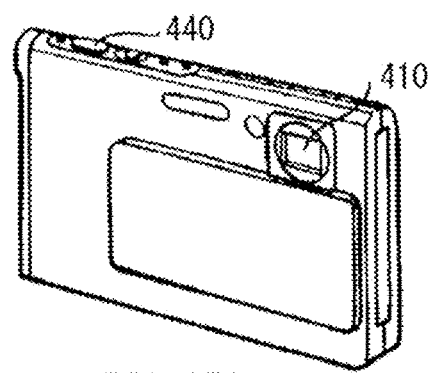
FIG. 37A is a perspective view illustrating appearance of a digital camera as seen from the front.
Figure 37B:
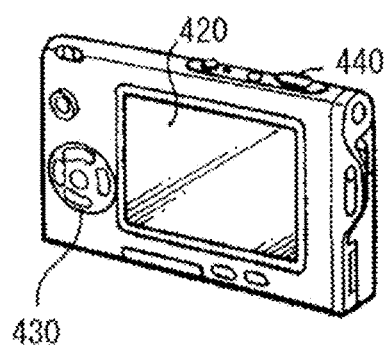
FIG. 37B is a perspective view illustrating appearance of the digital camera as seen from the back.

FIGS. 37A and 37B each illustrate appearance of a digital camera, in which FIG. 37A illustrates appearance of the digital camera as viewed from the front (from photographic object side), and FIG. 37B illustrates appearance of the digital camera as viewed from the back (from image side). The digital camera may include, for example, a light emitting section 410 for flash, a display section 420, a menu switch 430, and a shutter release button 440. The display section 420 is configured of the display 2 as described above.

Application Example 5

Figure 38:
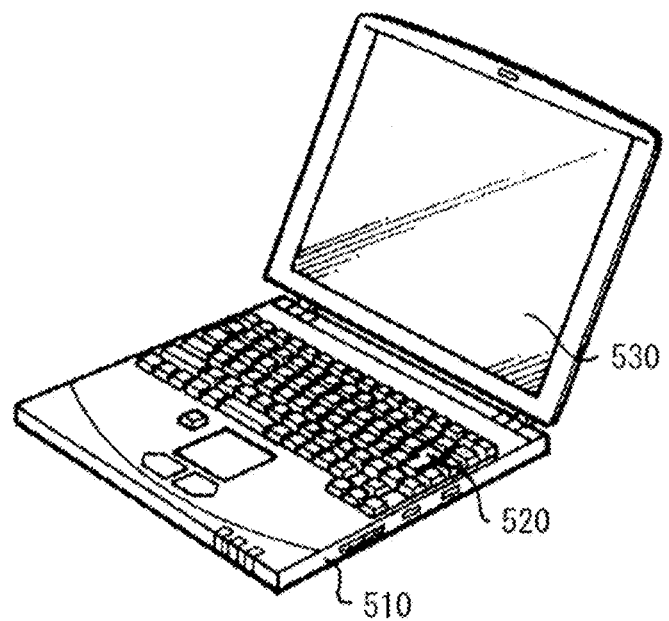
FIG. 38 is a perspective view illustrating appearance of a notebook personal computer.

FIG. 38 illustrates appearance of a notebook personal computer. The notebook personal computer may include, for example, a main body 510, a keyboard 520 for input operation of characters and the like, and a display section 530 that displays images. The display section 530 is configured of the display 2 as described above.

Application Example 6

Figure 39:
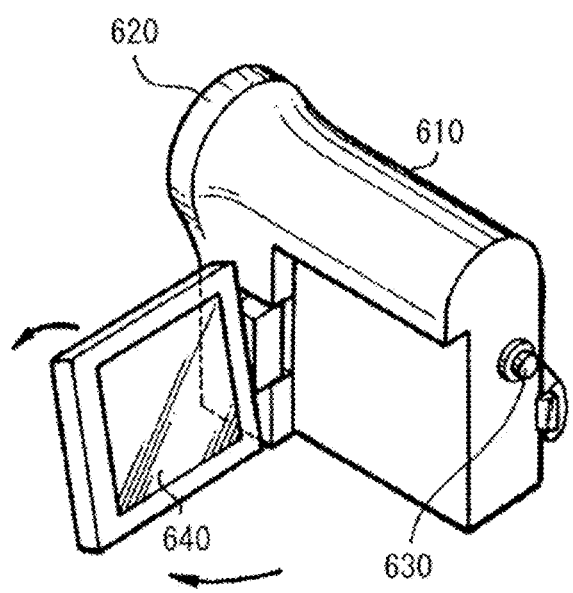
FIG. 39 is a perspective view illustrating appearance of a video camera.

FIG. 39 illustrates appearance of a video camera. The video camera may include, for example, a main body section 610, an object-shooting lens 620 provided on a front side face of the main body section 610, a start/stop switch 630 for shooting, and a display section 640. The display section 640 is configured of the display 2 as described above.

Application Example 7

Figure 40A:
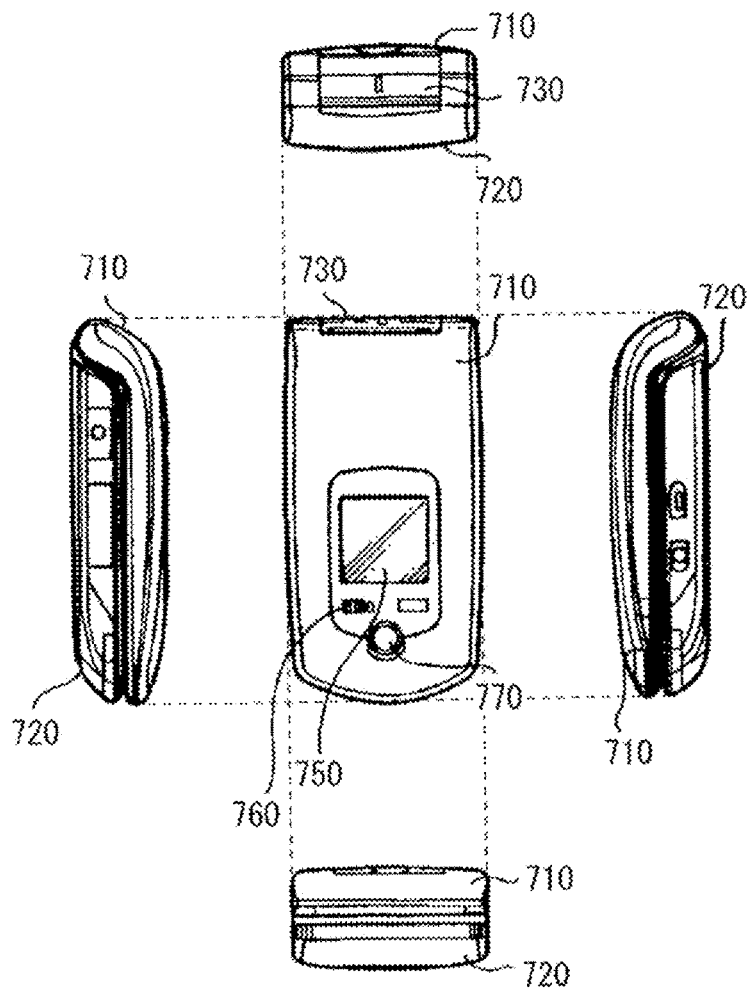
FIG. 40A illustrates appearance of a mobile phone in a closed state, as seen from the front, the left side, the right side, the top, and the bottom.
Figure 40B:
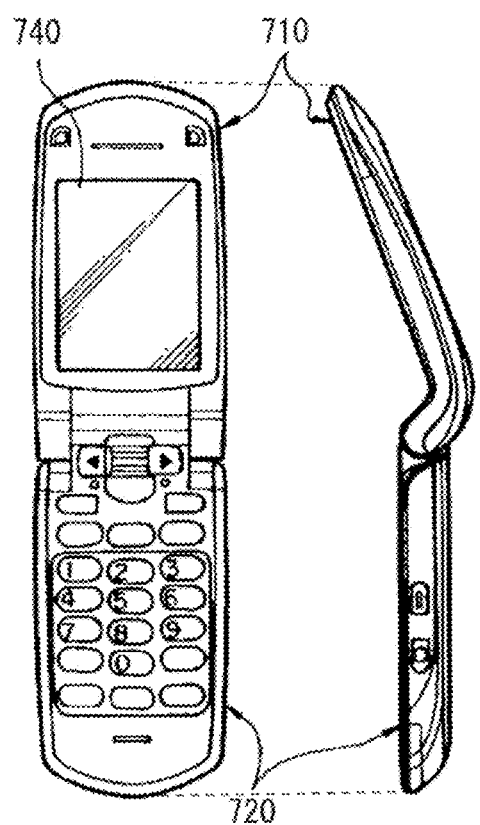
FIG. 40B illustrates appearance of the mobile phone in an open state, as seen from the front and the side.

FIGS. 40A and 40B each illustrate appearance of a mobile phone. For example, the mobile phone may have a configuration in which an upper housing 710 and a lower housing 720 are connected to each other by a coupling section (hinge section) 730, and may include a display 740, a sub display 750, a picture light 760, and a camera 770. The display 740 or the sub display 750 is configured of the display 2 as described above.

Although the technology has been described in the foregoing by way of example with reference to the example embodiments and the modifications, the technology is not limited thereto but may be modified in a wide variety of ways.

For example, one of the side surfaces of the light-guide plate serves as the light entering surface in the example embodiments and the modifications. However, two or more side surfaces thereof each may serve as the light entering surface, and the light sources may be disposed to face each of such light entering surfaces.

Also, the example embodiments and the modifications have been described with reference to an example in which two light-guide plates (the first light-guide plate 11A and the second light-guide plate 11B) are stacked. The light-guide plate in the disclosure, however, is not limited thereto. The light-guide plate may be configured by a single light-guide plate, or may have a configuration in which three or more light-guide plates are stacked.

Factors such as material and thickness of each layer described in the example embodiments and the modification are non-limiting, and other material and thickness may be used.

Further, effects described in the example embodiments and the modifications are illustrative. Effects achieved by the disclosure may be those that are different from the above-described effects, or may include other effects in addition to those described above.

Furthermore, the technology encompasses any possible combination of some or all of the various embodiments and the modifications described herein and incorporated herein.

It is possible to achieve at least the following configurations from the above-described example embodiments and the modifications of the disclosure.

(1) A light-emitting unit, including:
a light-guide section having a light entering surface; and
a plurality of light sources opposed to the light entering surface of the light-guide section and arrayed in a first direction, and each having an anisotropy in emission intensity, wherein
pattern shape of light applied from any of the light sources to the light entering surface has a shape anisotropy, and
the light sources are each disposed to allow a longitudinal direction of the pattern shape to be inclined relative to the first direction.

(2) The light-emitting unit according to (1), wherein
the light sources include two or more types of light sources, the two or more types of light sources being different from each other in ratio of a minimum value of a half-value angle in emission light to a maximum value of the half-value angle, and
the two or more light sources are disposed to allow a first inclination angle of the longitudinal direction relative to the first direction to be larger as the ratio is smaller.

(3) The light-emitting unit according to (1) or (2), wherein the light sources are disposed to allow optical axes of the respective light sources to be inclined relative to a second direction, the second direction being perpendicular to the light entering surface.

(4) The light-emitting unit according to (3), wherein
the light sources include two or more types of light sources, the two or more types of light sources being different from each other in ratio of a minimum value of a half-value angle in emission light to a maximum value of the half-value angle, and
the two or more light sources are disposed to allow a second inclination angle of each of the optical axes relative to the second direction to be larger as the ratio is smaller.

(5) The light-emitting unit according to (2) or (4), wherein the two or more types of light sources each include a laser diode, the laser diode being configured to emit color light of one of red, green, and blue.

(6) The light-emitting unit according to any one of (1) to (5), wherein the following expression (1) is satisfied:

$$2*L_1*\tan\theta a*\sin\theta r \le t \quad (1)$$

where $L_1$ is a distance between one of the light sources and the light-guide section, $\theta a$ is a maximum value of a half-value angle in emission light of one of the light sources, $\theta r$ is a first inclination angle of the longitudinal direction relative to the first direction, and t is a thickness of the light-guide section.

(7) The light-emitting unit according to any one of (1) to (6), wherein the following expressions (2) to (4) are satisfied for light sources, in the light sources, that are equal to each other in ratio of a minimum value of a half-value angle in emission light to a maximum value of the half-value angle:

$$P_1/2/\tan\theta_2 < L_2 \quad (2)$$

$$\theta_2 = \sin^{-1}(\sin\theta_1/n) \quad (3)$$

$$\theta_1 = \tan^{-1}(\tan\theta a*\cos\theta r) \quad (4)$$

where $L_2$ is a distance from the light entering surface of the light-guide section to an effective utilization region, $P_1$ is an interval between the light sources that are equal in ratio of the minimum value of the half-value angle to the maximum value of the half-value angle to each other, n is a refractive index of the light-guide section, $\theta a$ is the maximum value of the half-value angle in the emission light of one of the light sources, and $\theta r$ is a first inclination angle of the longitudinal direction relative to the first direction.

(8) The light-emitting unit according to (7), wherein the distance $L_2$ from the light entering surface of the light-guide section to the effective utilization region is equivalent to ⅓ of a light-guide length of the light-guide section.

(9) The light-emitting unit according to any one of (1) to (8), wherein the light-guide section includes a plate-shaped member including a pair of main surfaces opposed to each other, one of the main surfaces being a light exiting surface and the other of the main surfaces being the light entering surface.

(10) The light-emitting unit according to (9), wherein
the light-guide section includes a first light-guide section and a second light-guide section that are stacked, and
a light entering surface of the first light-guide section and a light entering surface of the second light-guide section are disposed to prevent mutual overlapping thereof in a direction of the stack.

(11) The light-emitting unit according to (10), wherein the light sources include a first light source disposed to oppose the light entering surface of the first light-guide section and a second light source disposed to oppose the light entering surface of the second light-guide section, the first light source and the second light source being disposed on respective axes different from each other in a plane parallel to a light emission plane.

(12) The light-emitting unit according to any one of (1) to (11), further including a wavelength conversion sheet disposed to oppose a light exiting surface of the light-guide section,
wherein each of the light sources includes a laser diode configured to emit blue light.

(13) The light-emitting unit according to any one of (1) to (12), wherein the light sources include a laser diode and a light-emitting diode.

(14) A display provided with a display panel and a light-emitting unit configured to illuminate the display panel, the light-emitting unit including:
a light-guide section having a light entering surface; and
plurality of light sources opposed to the light entering surface of the light-guide section and arrayed in a first direction, and each having an anisotropy in emission intensity, wherein pattern shape of light applied from any of the light sources to the light entering surface has a shape anisotropy, and the light sources are each disposed to allow a longitudinal direction of the pattern shape to be inclined relative to the first direction.

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A light-emitting unit, comprising:
 a light-guide section having a light entering surface; and
 a plurality of light sources opposed to the light entering surface of the light-guide section and arrayed in a first direction, and each having an anisotropy in emission intensity, wherein
 a pattern shape of light applied from any of the light sources to the light entering surface has a shape anisotropy, and
 the light sources are each disposed to allow a longitudinal direction of the pattern shape to be inclined relative to the first direction.

2. The light-emitting unit according to claim 1, wherein the light sources comprise two or more types of light sources, the two or more types of light sources being different from each other in ratio of a minimum value of a half-value angle in emission light to a maximum value of the half-value angle, and
 the two or more light sources are disposed to allow a first inclination angle of the longitudinal direction relative to the first direction to be larger as the ratio is smaller.

3. The light-emitting unit according to claim 1, wherein the light sources are disposed to allow optical axes of the respective light sources to be inclined relative to a second direction, the second direction being perpendicular to the light entering surface.

4. The light-emitting unit according to claim 3, wherein
 the light sources comprise two or more types of light sources, the two or more types of light sources being different from each other in ratio of a minimum value of a half-value angle in emission light to a maximum value of the half-value angle, and
 the two or more light sources are disposed to allow a second inclination angle of each of the optical axes relative to the second direction to be larger as the ratio is smaller.

5. The light-emitting unit according to claim 2, wherein the two or more types of light sources each comprise a laser diode, the laser diode being configured to emit color light of one of red, green, and blue.

6. The light-emitting unit according to claim 1, wherein the following expression (1) is satisfied:

$$2*L_1*\tan\theta a*\sin\theta r \leq t \quad (1)$$

where $L_1$ is a distance between one of the light sources and the light-guide section, $\theta a$ is a maximum value of a half-value angle in emission light of one of the light sources, $\theta r$ is a first inclination angle of the longitudinal direction relative to the first direction, and t is a thickness of the light-guide section.

7. The light-emitting unit according to claim 1, wherein the following expressions (2) to (4) are satisfied for light sources, in the light sources, that are equal to each other in ratio of a minimum value of a half-value angle in emission light to a maximum value of the half-value angle:

$$P_1/2/\tan\theta_2 < L_2 \quad (2)$$

$$\theta_2 = \sin^{-1}(\sin\theta_1/n) \quad (3)$$

$$\theta_1 = \tan^{-1}(\tan\theta a*\cos\theta r) \quad (4)$$

where $L_2$ is a distance from the light entering surface of the light-guide section to an effective utilization region, $P_1$ is an interval between the light sources that are equal in ratio of the minimum value of the half-value angle to the maximum value of the half-value angle to each other, n is a refractive index of the light-guide section, $\theta a$ is the maximum value of the half-value angle in the emission light of one of the light sources, and $\theta r$ is a first inclination angle of the longitudinal direction relative to the first direction.

8. The light-emitting unit according to claim 7, wherein the distance $L_2$ from the light entering surface of the light-guide section to the effective utilization region is equivalent to ⅓ of a light-guide length of the light-guide section.

9. The light-emitting unit according to claim 1, wherein the light-guide section comprises a plate-shaped member including a pair of main surfaces opposed to each other, one of the main surfaces being a light exiting surface and the other of the main surfaces being the light entering surface.

10. The light-emitting unit according to claim 9, wherein
 the light-guide section comprises a first light-guide section and a second light-guide section that are stacked, and
 a light entering surface of the first light-guide section and a light entering surface of the second light-guide section are disposed to prevent mutual overlapping thereof in a direction of the stack.

11. The light-emitting unit according to claim 10, wherein the light sources comprise a first light source disposed to oppose the light entering surface of the first light-guide section and a second light source disposed to oppose the light entering surface of the second light-guide section, the first light source and the second light source being disposed on respective axes different from each other in a plane parallel to a light emission plane.

12. The light-emitting unit according to claim 1, further comprising a wavelength conversion sheet disposed to oppose a light exiting surface of the light-guide section,
 wherein each of the light sources comprises a laser diode configured to emit blue light.

13. The light-emitting unit according to claim 1, wherein the light sources comprise a laser diode and a light-emitting diode.

14. A display provided with a display panel and a light-emitting unit configured to illuminate the display panel, the light-emitting unit comprising:
- a light-guide section having a light entering surface; and
    - a plurality of light sources opposed to the light entering surface of the light-guide section and arrayed in a first direction, and each having an anisotropy in emission intensity, wherein
    - a pattern shape of light applied from any of the light sources to the light entering surface has a shape anisotropy, and
    - the light sources are each disposed to allow a longitudinal direction of the pattern shape to be inclined relative to the first direction.

* * * * *